US007322884B2

(12) United States Patent
Emori et al.

(10) Patent No.: US 7,322,884 B2
(45) Date of Patent: Jan. 29, 2008

(54) GAMING MACHINE HAVING A VARIABLE DISPLAY

(75) Inventors: Kazuki Emori, Tokyo (JP); Hideaki Imura, Tokyo (JP)

(73) Assignee: Aruze Corporation, Tokyo (JP)

( * ) Notice: Subject to any disclaimer, the term of this patent is extended or adjusted under 35 U.S.C. 154(b) by 611 days.

(21) Appl. No.: 10/697,007

(22) Filed: Oct. 31, 2003

(65) Prior Publication Data

US 2004/0209681 A1 Oct. 21, 2004

(30) Foreign Application Priority Data

Nov. 20, 2002 (JP) ............................ 2002-336868

(51) Int. Cl.
*A63F 13/00* (2006.01)

(52) U.S. Cl. .......................................... 463/16; 463/25

(58) Field of Classification Search .................. 463/30, 463/25, 16; 345/4, 1.2; 273/274
See application file for complete search history.

(56) References Cited

U.S. PATENT DOCUMENTS

| | | | | |
|---|---|---|---|---|
| 4,562,433 A * | 12/1985 | Biferno | ......................... | 345/4 |
| 2001/0031658 A1* | 10/2001 | Ozaki et al. | .................. | 463/16 |
| 2003/0064796 A1* | 4/2003 | Glavich et al. | ............... | 463/25 |
| 2003/0087690 A1 | 5/2003 | Loose et al. | | |
| 2003/0130033 A1* | 7/2003 | Loose | ......................... | 463/30 |

FOREIGN PATENT DOCUMENTS

| | | |
|---|---|---|
| JP | 08080364 | 3/1996 |
| JP | 08117409 | 5/1996 |
| JP | 2000325597 | 11/2000 |
| JP | 2001-353255 A | 12/2001 |
| WO | WO-00/32286 | 6/2000 |
| WO | WO-03/039699 A1 | 5/2003 |

OTHER PUBLICATIONS

European Search Report Dated Aug. 3, 2004.

* cited by examiner

*Primary Examiner*—Robert E Pezzuto
(74) *Attorney, Agent, or Firm*—Rader, Fishman & Grauer, PLLC

(57) ABSTRACT

The gaming machine has the game result display means including the reels (3L, 3C, 3R) and the liquid crystal display device (31) arranged at a more front side than a display area of the reels (3L, 3C, 3R), and the liquid crystal display device (31) displays the specific image (91) over the substantially whole liquid crystal display area (2*b*) including the symbols display areas (21L, 21C, 21R) through which the reels (3L, 3C, 3R) can be seen and recognized.

9 Claims, 13 Drawing Sheets

FIG.7A WHEN LIQUID CRYSTAL EXISTING AT SYMBOL DISPLAY AREAS IS NOT DRIVEN
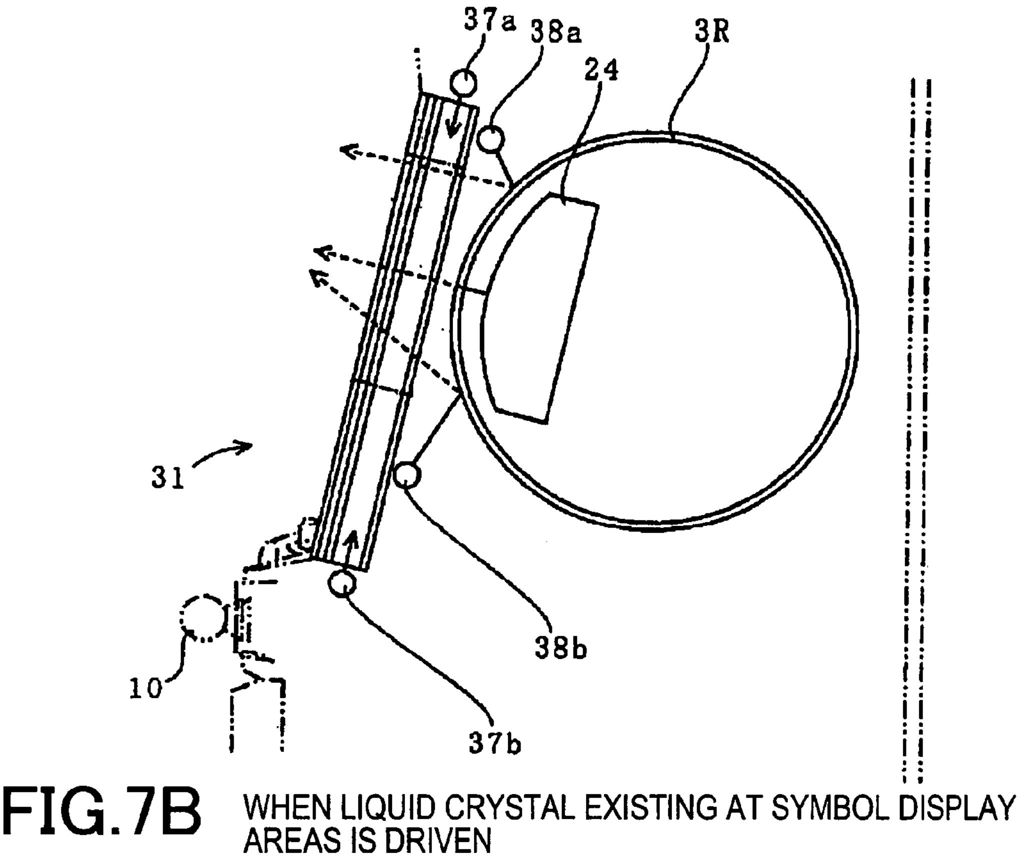
FIG.7B WHEN LIQUID CRYSTAL EXISTING AT SYMBOL DISPLAY AREAS IS DRIVEN
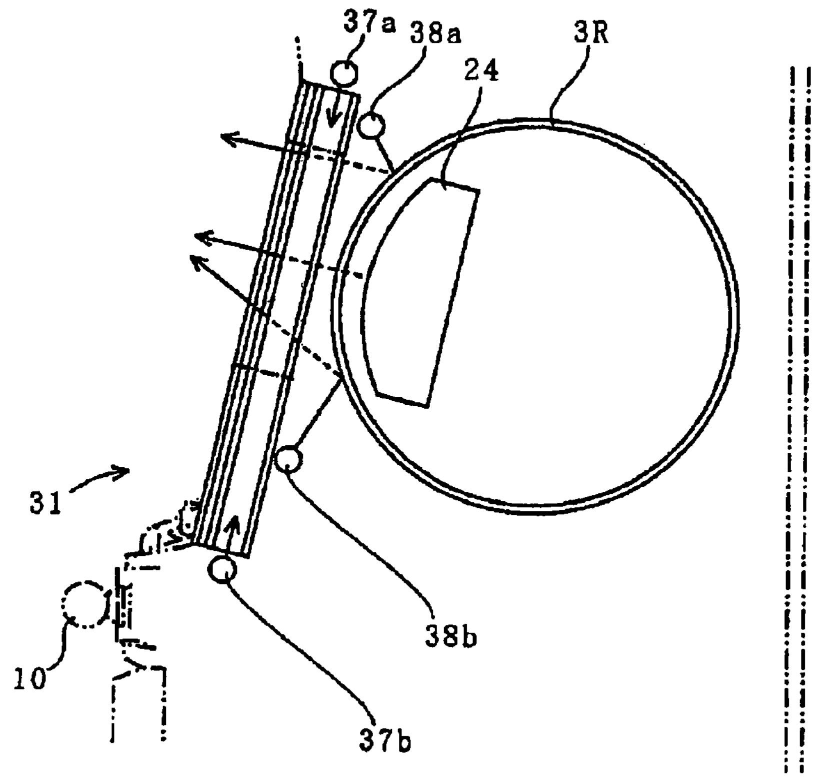

GAMING MACHINE HAVING A VARIABLE DISPLAY

FIELD OF TECHNOLOGY

The present invention relates to a gaming machine having variable display means for variably displaying various symbols necessary for a game and control means such as microcomputer and the like for controlling the variable display, the gaming machine including so-called Japanese pachi-slot machine; slot machine; ball flipping machine such as the first grade~third grade Japanese pachinko machine, arrange ball machine, mah-jong ball gaming machine or slit-slot machine; video slot machine; video poker machine and the like.

DESCRIPTION OF RELATED ART

For example, the Japanese pachi-slot machine has a mechanically variable display device in which it is provided a plurality of rotating reels each of which variably displays plural symbols within a display window arranged in front of the machine, the reels being parallel provided in plural lines. According to start operation by a player, the control means drives and controls the variable display device and the reels are rotated, thereby symbols on the reels are variably displayed. And rotation of each reel is stopped automatically or based on stop operation by the player. At that time, in a case that the symbols of each reel appearing within the display window comprises a predetermined combination (the winning mode), game media such as medals or coins are paid out, thereby a predetermined benefit is given to the player.

Further, it is previously proposed a gaming machine having a plurality of reel drums, reel strips each of which is arranged on an outer periphery of each reel drum and on each outer surface of which the symbols are described in a divided manner, light sources each of which illuminates the symbol division on each reel strip from the backside thereof and is arranged within each reel drum and control means for controlling illumination by the light sources. Here, in the reel strip, the symbol portion is made semitransparent and the background of the symbol is made transparent or semi-transparent, and the light source is constructed from a plurality of luminous diodes arranged in a dot-matrix manner. The control means controls light emission of each luminous diode, thereby light emission of the light source is controlled so as to display characters or figures by the emitted diodes.

See, for example, Japanese unexamined Publication No. 2001-353255.

SUMMARY OF THE INVENTION

However, it is desired a gaming machine in which interest for games can be further raised, in comparison with the effect in the above gaming machine that the control means controls light emission of each luminous diode, thereby light emission of the light source is controlled so as to display characters or figures by the emitted diodes.

The object of the present invention is to provide a gaming machine in which the game result display means includes first display means and second display means arranged at a more front side than a display area of the first display means when seen from a front side of the gaming machine, and the second display means displays a specific image over a substantially whole display area of the second display means including symbol display areas through which the first display means is seen and recognized, thereby interest for games can be raised.

The gaming machine of the present invention comprises: game result display means for displaying a game result; and beneficial state generating means (for example, the main control circuit 41 mentioned later) for generating a beneficial state for a player when a specific game result is displayed on the game result display means; wherein the game result display means is constructed so as to include first display means (for example, reels 3L, 3C, 3R mentioned later) and second display means (for example, liquid crystal display device 31 mentioned later) arranged at a more front side than a display area of the first display means when seen from a front side of the gaming machine; and wherein the second display means displays a specific image over a substantially whole display area (for example, the liquid crystal display unit 2*b* mentioned later) of the second display means including symbol display areas (for example, the symbol display areas 21L, 21C, 21R mentioned later) through which the first display means is seen and recognized.

In the gaming machine of the present invention, the specific image may be displayed based on information concerning with a game.

In the present invention, the gaming machine may further comprise:

internal winning combination determination means for determining an internal winning combination based on an output from game start instruction means for starting the game; and game result display control means for conducting display control of the game result display means based on a determined result by the internal winning combination determination means; wherein the specific image may be displayed based on information concerning with the internal winning combination included in the information concerning with the game.

In the gaming machine of the present invention, a probability with which the specific image is displayed in a case that the internal winning combination determination means determines a specific winning combinations as the internal winning combination, can be set higher, comparing with a probability with which the specific image is displayed in a case that the internal winning combination determination means determines a winning combination other than the specific winning combination as the internal winning combination.

In the present invention of the gaming machine, the specific image may be displayed based on that a winning combination, which is materialized, included in the information concerning with the game, is the specific winning combination.

In the present invention, the gaming machine may further comprise another display means other than the first display means and the second display means; wherein the second display means and the another display means may display images which have relevance with each other.

According to the present invention, it can provide a gaming machine comprising: game result display means for displaying a game result; and beneficial state generating means for generating a beneficial state for a player when a specific game result is displayed on the game result display means; wherein the game result display means includes first display means and second display means arranged at a more front side than a display area of the first display means when seen from a front side of the gaming machine; and wherein the second display means displays a specific image over a substantially whole display area of the second display means including symbol display areas through which the first display means is seen and recognized. Thereby, interest for games can be raised.

BRIEF DESCRIPTION OF THE DRAWINGS

FIGS. 7A and 7B are explanatory views for explaining function of the LED lamps and fluorescent lamps.

DETAILED DESCRIPTION OF THE INVENTION

Figure 1:
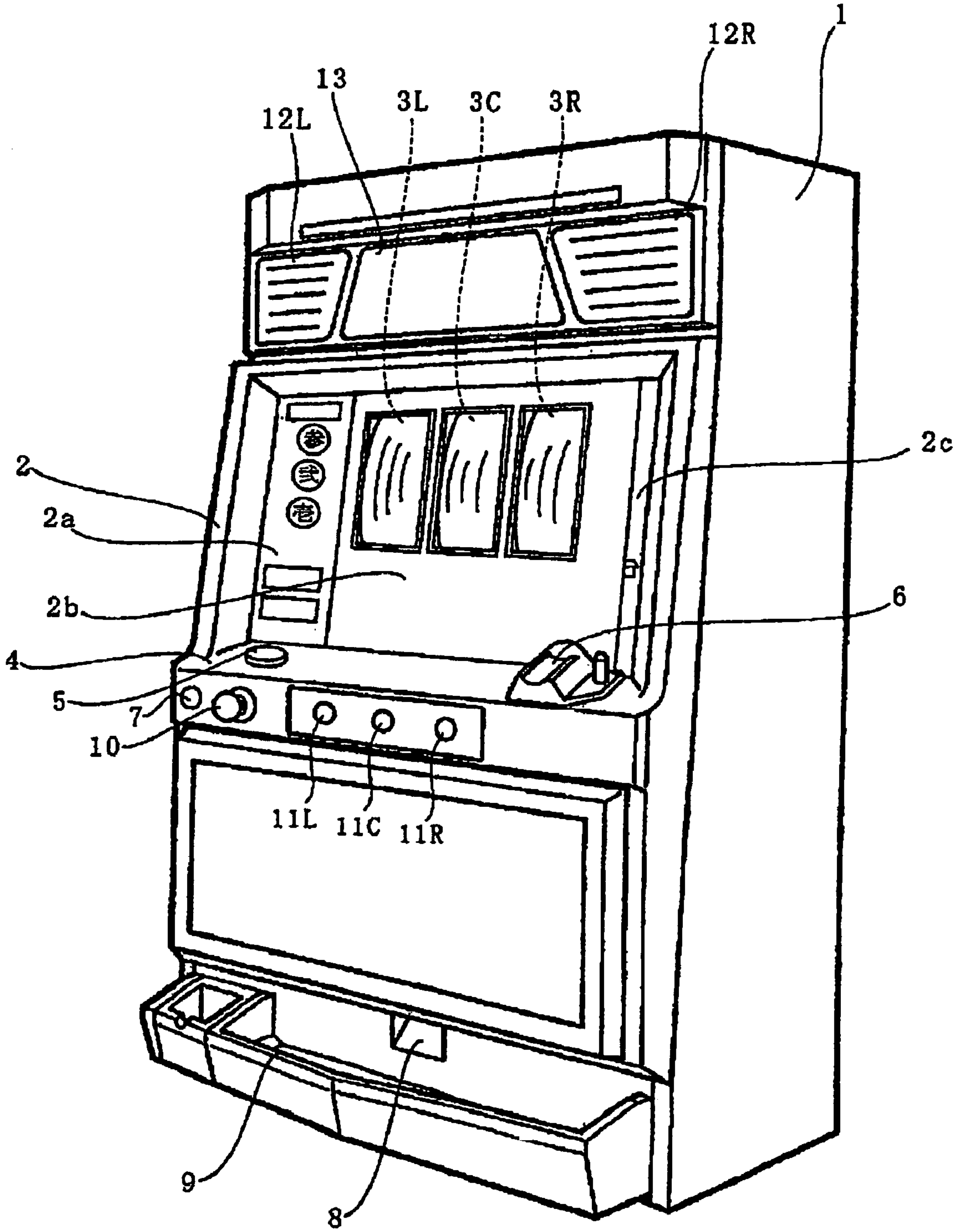
FIG. 1 is a perspective view of a slot machine according to the embodiment.

FIG. 1 is a perspective view showing an outlined shape of a gaming machine 1 according to one embodiment of the present invention. Here, the gaming machine 1 is a so-called Japanese pachi-slot machine. Though, in the gaming machine 1, a player plays games by using game media such as coins, medals or tokens, or a card in which information of game value given to the player is stored, it will be described hereinafter the gaming machine 1 in which medals are used.

Presently, the Japanese pachi-slot machine in the main current has a plural kinds of winning modes. In particular, when a predetermined winning combination is accepted, the player can obtain a more beneficial gaming state than a normal gaming state for a predetermined period without finishing the game by only one payout of medals. As such winning combination, there exist one winning combination in which the game relatively giving large benefit to the player can be done in predetermined times (this winning combination is called "BIG BONUS" and abbreviated as "BB" hereinafter) and another winning combination in which the game relatively giving small benefit to the player in predetermined times (this winning combination is called "REGULAR BONUS" and abbreviated "RB" hereinafter).

And in the Japanese pachi-slot machine in the main current, in order to materialize the winning combination that medals or coins are paid out when a predetermined symbol combination stands side by side along pay lines made activated (abbreviated as "activated line" hereinafter), it is required to internally win the winning combination (abbreviated as "internal winning" hereinafter) by the internal lottery treatment (abbreviated as "internal lottery" hereinafter) and to conduct stop operation of the symbols by the player at the timing that the symbol combination indicating the winning combination internally won (abbreviated as "internal winning combination" hereinafter) can stop along the activated lines. That is to say, even if the winning combination is internally won, the winning according to the internal winning combination cannot be realized when the stop operation by the player is out of the timing. Namely, in the present Japanese pachi-slot machine in the main current, it is required technique to conduct stop operation of the symbols at good timing. This technique is called "observation push", thus it is highly appreciated the technical intervention in the present Japanese pachi-slot machine.

At the front surface of a cabinet 2 entirely forming the gaming machine 1, a panel display unit 2*a*, a liquid crystal display unit 2*b* and a fixed display unit 2*c*, which have substantially vertical planes, are formed. As for the panel display unit 2*a*, the liquid crystal display unit 2*b* and the fixed display unit 2*c*, they will be described with reference to FIG. 2, hereinafter. In the cabinet 2 (at the rear side of the liquid crystal display unit 2*b*), three reels 3L, 3C, 3R (the first display means comprising the game result display means), on each outer periphery of which symbol line comprising a plural kinds of symbols is described, are rotatably arranged along a horizontal line. The reels 3L, 3C, 3R form the variable display means. Symbols on each reel (rotational drum type display device) can be seen through symbol display areas 21L, 21C, 21R (shown in FIG. 2 hereinafter). Each reel is constructed so as to be able to rotate at a constant rotational speed (for example, 80 rotations/minute).

At a lower position of the panel display unit 2*a*, the liquid crystal display unit 2*b* and the fixed display unit 2*c*, a frontward projection portion 4 having a substantially horizontal plane is formed. At the left side of the frontward projection portion 4, it is arranged a BET switch 5 for betting medals credited by pressing button operation. At the right side of the frontward projection portion 4, a medal insertion slot 6 is formed. At the front left side of the frontward projection portion 4, it is provided a c/p switch 7 for switching credit/payout of medals obtained in the game by the player based on pressing button operation. On the basis of switching by the c/p switch 7, medals are paid out from a medal payout opening 8 and the paid medals are accumulated in a medal receiving tray 9.

At the right side of the C/P switch 7, a start lever 10 (game start instruction means operable by the player), which starts rotation of the reels when operated by the player and starts variable display of the symbols (starts the game) within each of the symbol display areas 21L, 21C, 21R (see FIG. 2), is provided so as to be able to rotate within a predetermined angle. At the front center of the frontward projection portion 4 and the right side of the start lever 10, three stop buttons 11L 11C, 11R (game result leading means operable by the player), which is operated to stop rotation of the reels 3L, 3C, 3R, respectively, are arranged. At the upper left and right sides of the cabinet 2, speakers 12L, 12R are arranged. Between the speakers 12L, 12R, a payout table panel 13 which shows winning combinations of the symbols and the number of medals paid out as awards, is provided.

Figure 2:
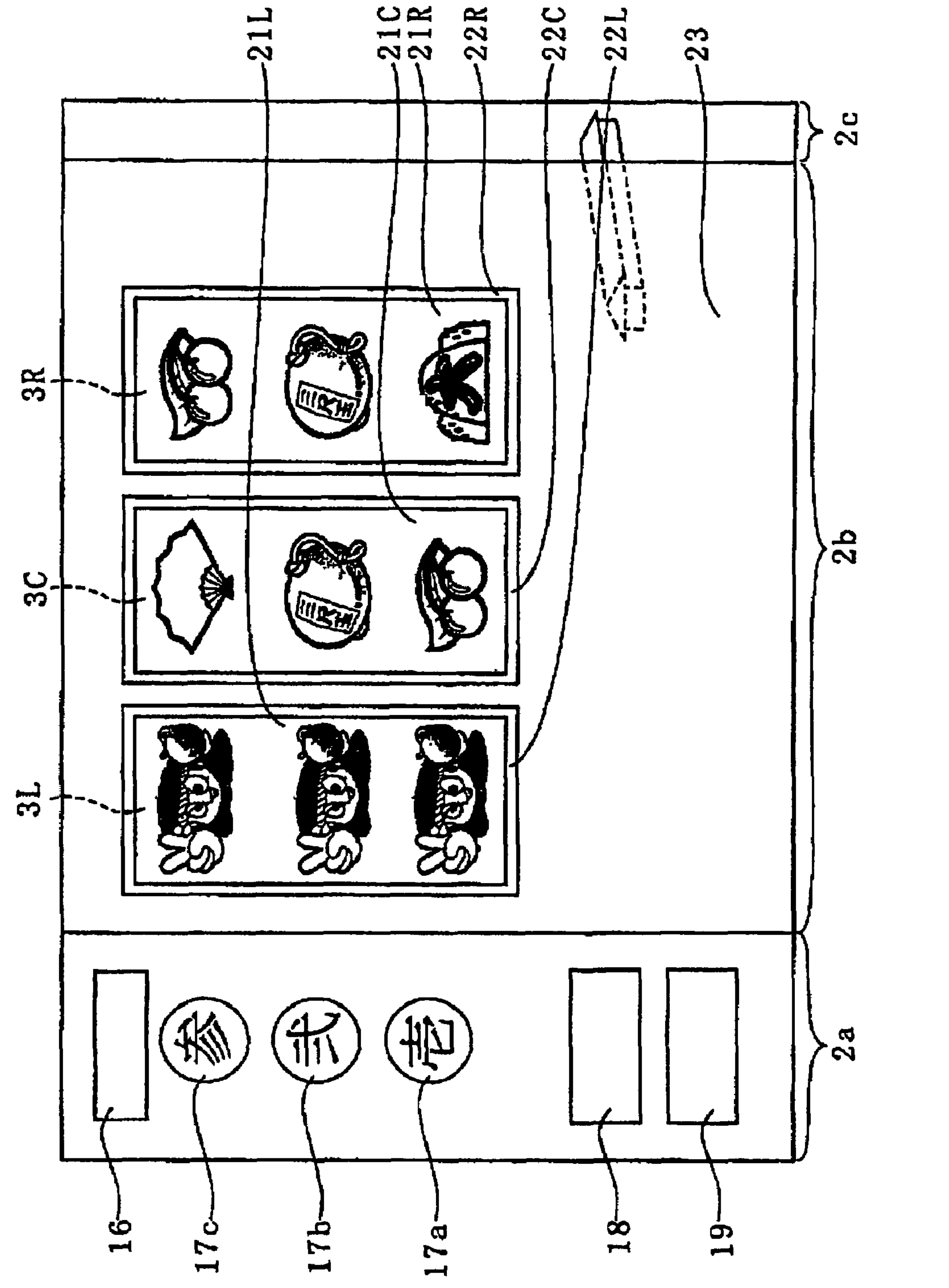
FIG. 2 is an explanatory view showing a panel display part and a liquid crystal display part.

With reference to FIG. 2, the panel display unit 2*a*, the liquid crystal display unit 2*b* and the fixed display unit 2*c* will be explained.

The panel display unit 2a comprises a bonus game information display part 16, BET lamps 17a~17c, a payout display part 18 and a credit display part 19. Here, the bonus display part 16 is constructed from 7-segment LEDs and displays the game information during the bonus game. The 1-BET lamp 17a, 2-BET lamp 17b and MAX-BET lamp 17c are turned on according to the medal number betted to conduct the game. The 1-BET lamp 17a is turned on when the betted medal number is "1". The 2-BET lamp 17b is turned on when the betted medal number is "2". And the MAX-BET lamp 17c is turned on when the betted medal number is "3". The payout display part 18 and the credit display part 19 are constructed from 7-segment LEDs respectively. The payout display part 18 displays the payout medal number when the winning is materialized. The credit display part 19 displays the medal number accumulated (credited).

The liquid crystal display unit 2b comprises the symbol display areas 21L, 21C, 21R, window frame display areas 22L, 22C, 22R and effect display area 23. The display contents displayed on the liquid crystal display 2b are variably changed according to the variable symbol display mode of the reels 3L, 3C, 3R, stop display mode of the symbols and operation of a liquid crystal display device 31 mentioned hereinafter.

The symbol display areas 21L, 21C, 21R are provided corresponding to the reels 3L, 3C, 3R, respectively, and display the symbols arranged on the outer periphery of the reels 3L, 3C, 3R and various effects thereon. Here, in a case that the reels 3L, 3C, 3R corresponding to the symbol display areas 21L, 21C, 21R are rotating or the stop buttons 11L, 11C, 11R corresponding to the symbol display areas 21L, 21C, 21R are in a operable state for stop operation of the reels 3L, 3C, 3R, each symbol display area 21L, 21C, 21R is transparently displayed so as to be able to easily recognize the symbols arranged on the outer peripheries of the reels 3L, 3C, 3R, and effect effected through still images or moving images by, for example, symbols, letters, figures, marks, characters is not displayed.

The window frame display areas 22L, 22C, 22R are formed so as to enclose each symbol display area 21L, 21C, 21R and represents the frames of the symbols arranged on the outer peripheries of the reels 3L, 3C, 3R.

The effect display area 23 is formed in an area other than the symbol display areas 21L, 21C, 21R and the window frame display areas 22L, 22C, 22R in the liquid crystal display unit 2b. This effect display area 23 displays the image (representing so-called "WIN LAMP") conclusively indicating that bonus winning is realizable, the effect to increase interest for games and the information necessary for the player to beneficially advance the game.

The fixed display unit 2c is an area to display the images determined beforehand. Concretely, the fixed display unit 2c displays "a part of row houses" which is described on a display plate 33 mentioned hereinafter. By combining the image displayed on the fixed display unit 2c and the image displayed on the effect display area 23, one still image or moving image can be displayed. In the embodiment, one complete image of the row houses can be displayed.

Further, with reference to FIGS. 3 and 4, LED lamps 29 arranged in the reels 3L, 3C, 3R will be described. The LED lamps 29 function as illumination means for illuminate the symbols arranged on the outer peripheries of the reels 3L, 3C, 3R and one of illumination means for illuminating the areas mainly corresponding to the symbol display areas 21L, 21C, 21R within an area of a liquid crystal panel 34 (mentioned later). Thus, the LED lamps 29 function as common illumination means for commonly illuminating the above symbols and the areas. And the LED lamps 29 also function as rear illumination means for illuminating the first display means from the backside thereof.

Figure 3:
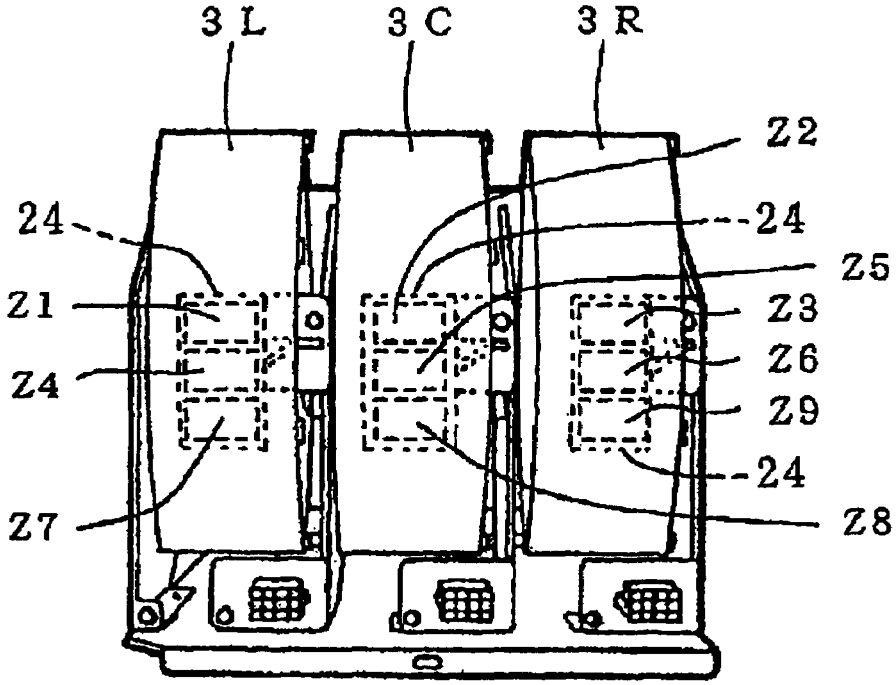
FIG. 3 is an explanatory view showing an external appearance of a reel mechanism in which lamps are arranged within each reel.

As shown in FIG. 3, in the reels 3L, 3C, 3R, there are arranged LED receiving circuit boards 24 which are positioned behind the symbols of three symbol lines (totally nine symbols), each symbol line appearing in each symbol display areas 21L, 21C, 21R when rotation of the reels 3L, 3C, 3R stop. Each LED receiving circuit board 24 has three LED receiving portions in each of which a plurality of LED lamps 29 are provided. Hereinafter, among nine LED receiving portions, the LED receiving portion is serially represented by Z1, Z2 and Z3 from the left portion in the horizontal upper line, the LED receiving portion is serially represented by Z4, Z5 and Z6 from the left portion in the horizontal center line and the LED receiving portion is serially represented by Z7, Z8 and Z9 from the left portion in the bottom horizontal line. The LED lamp 29 illuminates the rear side of the reel sheet by white light, the reel sheet being attached to the reel 3L, 3C, 3R along the outer periphery thereof. The reel sheet is made translucent, thus light emitted from the LED lamp 29 permeates to the front plane of the reel sheet.

Figure 4:
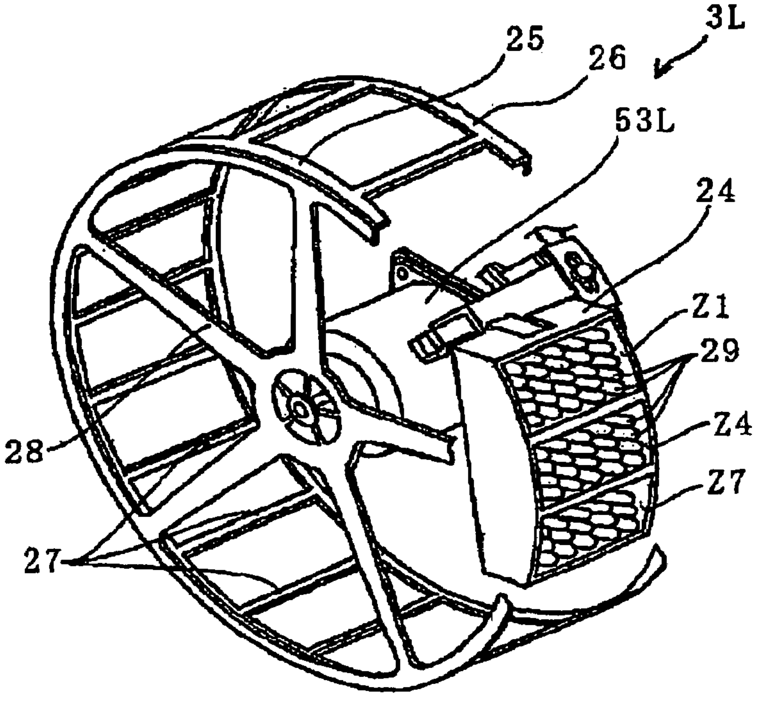
FIG. 4 is a perspective view showing a reel and a circuit board for receiving LEDs therein arranged in the reel.

As shown in FIG. 4, the reel 3L is constructed from a cylindrical frame construction in which two circular frames 25 and 26 with the same shapes are connected by a plurality of connecting members 27 while separating with a distance (corresponding to the reel width) therebetween, and transmitting members 28 for transmitting driving force of a stepping motor 53L (see FIG. 8) arranged in the center position of the frame construction to the circular frames 25 and 26. Here, the reel sheet attached to the outer periphery of the reel 3L is omitted.

The LED receiving circuit board 24 arranged within the reel 3L has three LED receiving portions Z1, Z4 and Z7, each receiving a plurality of LED lamps 29. The LED receiving circuit board 24 is arranged so that the LED receiving portions Z1, Z4, Z7 position at rear sides of the symbols (totally three symbols), respectively, the symbols being seen through the symbol display area 21L by the player. Here, though the reels 3C and 3R are not shown, both reels have the same construction and the LED receiving circuit board 24 is arranged within each reel.

Figure 5:
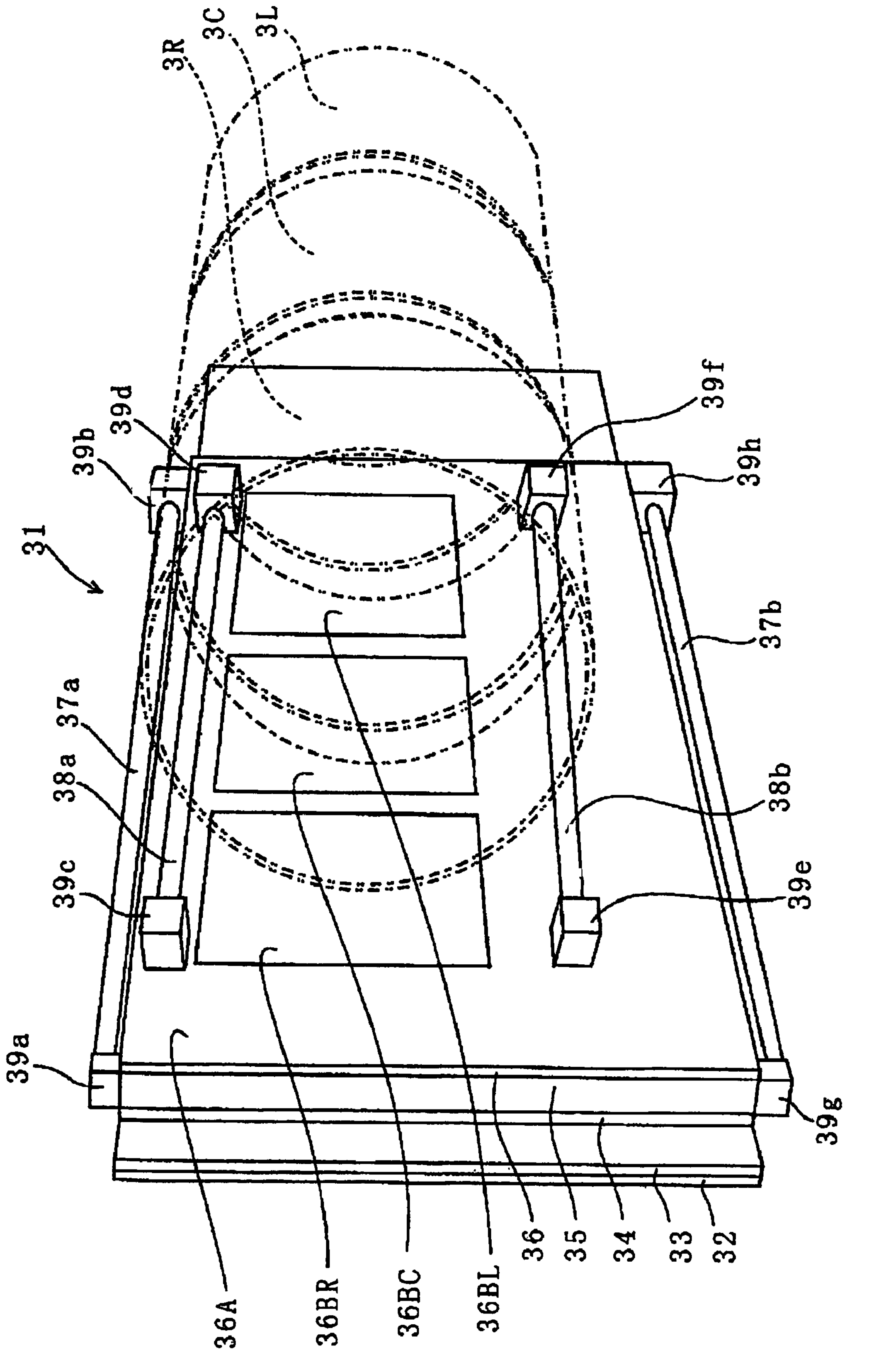
FIG. 5 is a perspective view roughly showing a construction of the liquid crystal display device.
Figure 6:
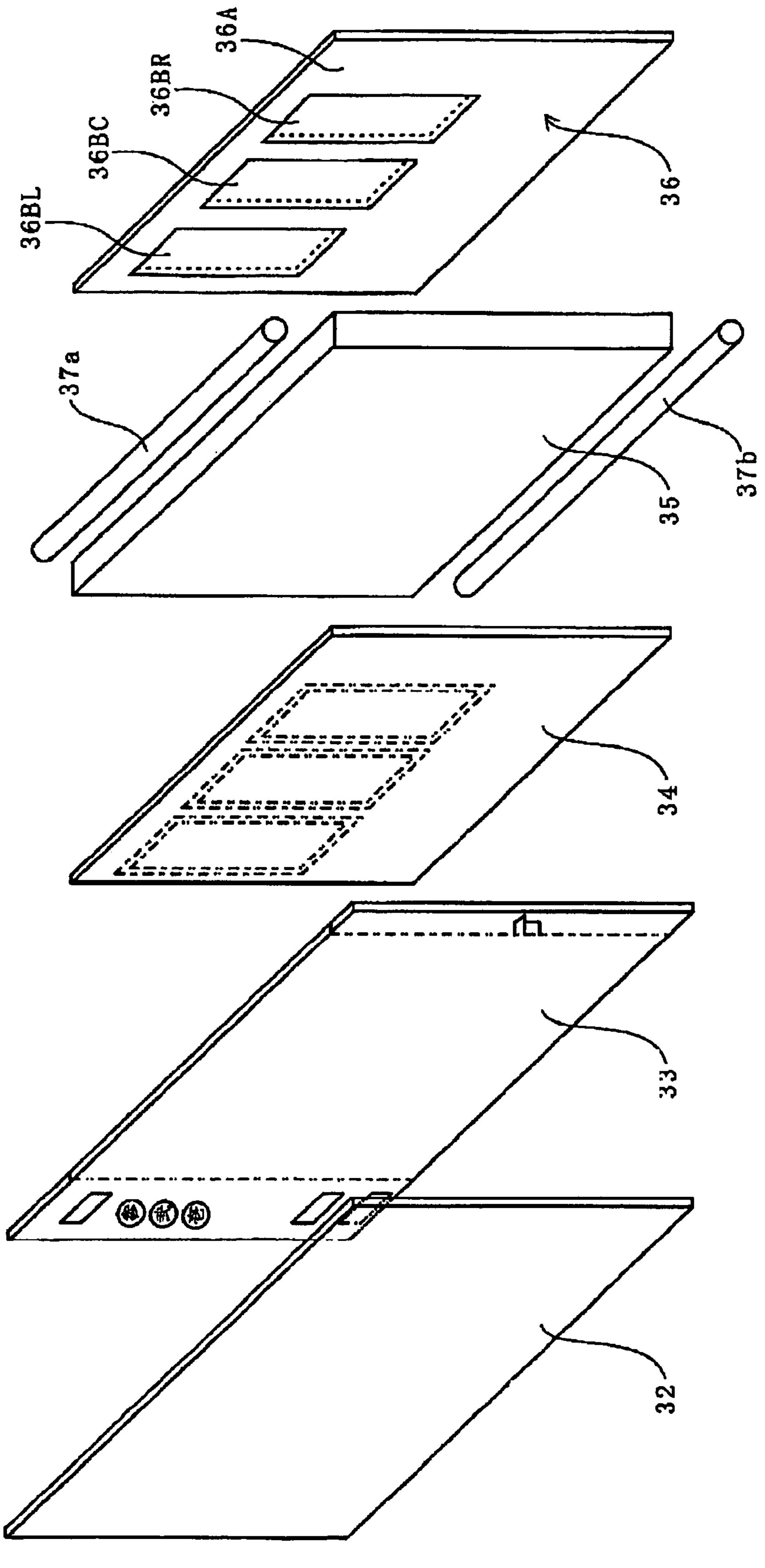
FIG. 6 is an exploded perspective view showing a part of the liquid crystal display device.

Next, with reference to FIGS. 5 and 6, a transmission type liquid crystal display device 31 (corresponding to the second display means constructing the game result display means) will be described. FIG. 5 is a perspective view (seeing from the rear side of the cabinet 2) showing outline construction of the liquid crystal display device 31. FIG. 6 is an exploded perspective view showing a partial construction of the liquid crystal display device 31.

The liquid crystal display device 31 is constructed from a protect glass 32, a display plate 33, a liquid crystal panel 34, a light guide plate 35, a reflection film 36, fluorescent lamps 37a, 37b, 38a, 38b functioning as so-called white light sources (capable of emitting light including light having all wavelengths with a predetermined ratio so that specific colors are inconspicuous to eyes of persons), lamp holders 39a~39h and a flexible circuit board (not shown) comprising a table carrier package (TCP) mounting an IC for driving the liquid crystal panel, the TCP being connected to a terminal portion of the liquid crystal panel 34. The liquid crystal display device 31 is arranged at a more front side than the display areas of the reels 3L, 3C, 3R (more front side than the display planes thereof) so as to spread over the reels 3L, 3C, 3R. And the reels 3L, 3C, 3R and the liquid crystal display device 31 are independently arranged (with a predetermined distance therebetween).

The protect glass 32 and the display plate 33 are made of light transmittable material. The protect glass 32 is provided with an object to protect the liquid crystal panel 34. At the areas corresponding to the panel display unit 2*a* of the display plate 33 and the fixed display unit 2*c*, images are described. Here, various display parts positioned at the rear side of the area in the display plate 33 corresponding to the panel display unit 2*a* and electric circuits for operating the BET lamps 17*a*~17*c* are omitted to show.

The liquid crystal panel 34 is formed by filling liquid crystal material in clearance formed between the transparent plate such as a glass plate on which thin film transistor layer is formed and the transparent plate facing thereto. The display mode of the liquid crystal panel 34 is set to normally white. Here, "normally white" means a construction that the liquid crystal panel 34 becomes in a white display state (light can advance toward the display plane, that is, light transmitted can be seen from outside) when the liquid crystal panel 34 is not driven. By utilizing the liquid crystal panel 34 constructed to have the normally white mode, the symbols (variable display and stop display of the symbol display parts) arranged on the reels 3L, 3C, 3R can be seen and recognized through the symbol display areas 21L, 21C, 21R even if it occurs a trouble that the liquid crystal panel cannot be driven. Thereby, the player can continue the game. That is to say, if the above trouble occurs, it can be conducted the game based on the basic function such as the variable display and the stop display of the reels 3L, 3C, 3R.

The light guide plate 35 is arranged at the rear side of the liquid crystal panel 34 in order to lead the light emitted from the luminescent lamps 37*a*, 37*b* to the liquid crystal panel 34 (to illuminate the liquid crystal panel). For example, the light guide plate 35 is constructed from the light transmittable member with thickness of about 2 cm (having light transmitting ability) made of acrylic resin.

As the reflection film 36, for example, it is used the member that silver deposition layer is formed on white polyester film or aluminium thin film. The reflection film 36 reflects light led to the light guide plate 35 toward the front side thereof. This reflection film 36 is constructed from a reflection area 36A and non-reflection areas (non-transmittable areas) 36BL, 36BC, 36BR. The non-reflection areas 36BL, 36BC, 36BR are formed as the light transmittable areas which are made of transparent material and transmit the light led thereto without reflecting, and are arranged at each front position of symbols (totally three symbols) displayed when rotation of the reels 3L, 3C, 3R is stopped. In this case, areas corresponding to the reel sheet function as the light transmittable areas. Concretely, sizes and positions of the non-reflection areas 36BL, 36BC, 36BR coincide with those of the symbol display areas 21L, 21C, 21R. The reflection area 36A reflects the light led thereto and functions as one of the illumination means for the area mainly corresponding to the window frame display areas 22L, 22C, 22R and the effect display area 23 within the area on liquid crystal panel 34. According to the above construction, since the player can see and recognize variable display and stop display of the symbols in the symbol display areas through the light transmittable areas in reflection means, the player can enjoy the game based on the display mode in the symbol display areas and the liquid crystal display device.

The fluorescent lamps 37*a* and 37*b* are arranged along the upper edge and the lower edge of the light guide plate 35 and both ends of the fluorescent lamp 37*a*, 37*b* are supported by lamp holders 39. The fluorescent lamps 37*a* and 37*b* function as illumination means for the area mainly corresponding to the window frame display areas 22L, 22C, 22R and the effect display area 23 within the area on the liquid crystal panel 34. Namely, the fluorescent lamps 37*a* and 37*b* emit light led to the light guide plate 35 (the lamps separately lead light to the light guide plate 35).

And the fluorescent lamps 38*a* and 38*b* are arranged so as to face toward the reels 3L, 3C, 3R at the upper and lower positions on the rear side of the reflection film 36. The light, which is emitted from the fluorescent lamps 38*a* and 38*b* and reflected on the surface of the reels 3L, 3C, 3R, further entered in the non-reflection areas 36BL, 36BC, 36BR, illuminates the liquid crystal panel 34. Therefore, the fluorescent lamps 38*a* and 38*b* function as the illumination means for illuminating the symbols arranged on the reels 3L, 3C, 3R and one of the illumination means for the areas mainly corresponding to the symbol display areas 21L, 21C, 21R within the area on the liquid crystal panel 34. The fluorescent lamps 38*a* and 38*b* function as common illumination means for illuminating both the above symbols and areas. Further, the fluorescent lamps 38*a* and 38*b* also function as the forward illumination means for illuminating the first display means from the front side thereof.

As mentioned above, the first display means and the second display means are commonly illuminated by the common illumination means. That is to say, since not only the first display means but also the second display means are illuminated by the light emitted from the common illumination means, cost becomes cheaper than a case that the illumination means is independently arranged for each display means. Further, by controlling the common illumination means illumination control can made simple and the same illumination for two display means can be also realized at the same time.

Next, with reference to FIG. 7, function of the LED lamp 29 and the fluorescent lamps 37*a*, 37*b*, 38*a*, 38*b* will be described. In FIG. 7, moving direction of the emitted light from the lamp is shown by arrows.

FIG. 7 (1) schematically shows function of each lamp when the liquid crystal existing at the symbol display areas 12L, 21C, 21R is not driven (voltage is not added between the transparent plates of portions corresponding to the symbol display areas in the liquid crystal panel 34).

A part of the light emitted from the fluorescent lamps 38*a*. 38*b* is reflected on the reel sheet. And a part of the light emitted from the LED lamps 29 arranged on the LED receiving circuit board 24 penetrates through the reel sheet. Since the above light penetrates through the non-reflection areas 36BL, 36BC, 36BR, the light guide plate 35 and the liquid crystal panel 36 both of which constructs the liquid crystal display device 31, the player can see and recognize the symbols arranged on the reels. Therefore, in a case that the liquid crystal existing at the symbol display areas 12L, 21C, 21R is not driven, the LED lamps 29 and the fluorescent lamps 38*a*, 38*b* function as the illumination means for the symbols arranged on the reels 3L, 3C, 3R.

On the contrary, the light emitted from the fluorescent lamps 37*a*, 37*b* and led into the light guide plate 35 penetrates through the liquid crystal panel 34 and enters in eyes of the player. That is, the fluorescent lamps 37*a*, 37*b* function as the illumination means for the area in the liquid crystal panel 34 corresponding to the above window frame display areas 22L, 22C, 22R and the effect display area 23.

FIG. 7 (2) schematically shows function of each lamp when the liquid crystal existing at the symbol display areas 12L, 21C, 21R is driven (voltage is added between the transparent plates of portions corresponding to the symbol display areas in the liquid crystal panel 34).

A part of the light emitted from the fluorescent lamps 38*a*, 38*b* is reflected on the reel sheet. And a part of the light emitted from the LED lamps 29 penetrates through the reel sheet. Since a part of the above light is reflected on or absorbed in or penetrated through the areas that the liquid crystal is driven within the area of the liquid crystal panel 34, the player can see and recognize the effect display and the like displayed on the symbol display areas 21L, 21C, 21R. Therefore, in a case that the liquid crystal existing at the symbol display areas 12L, 21C, 21R is driven, the LED lamps 29 and the fluorescent lamps 38*a*, 38*b* function as the illumination means corresponding to the symbol display areas 21L, 21C, 21R within the area of the liquid crystal panel 34.

Here, in a case that a part of the areas corresponding to the symbol display areas 21L, 21C, 21R within the area of the liquid crystal panel 34 is driven, the LED lamps 29 and the fluorescent lamps 38*a*, 38*b* function as the illumination means for the symbols arranged on the reels 3L, 3C, 3R and as the areas corresponding to the liquid crystal not driven in the symbol display areas 21L, 21C, 21R within the liquid crystal panel 34.

Figure 8:
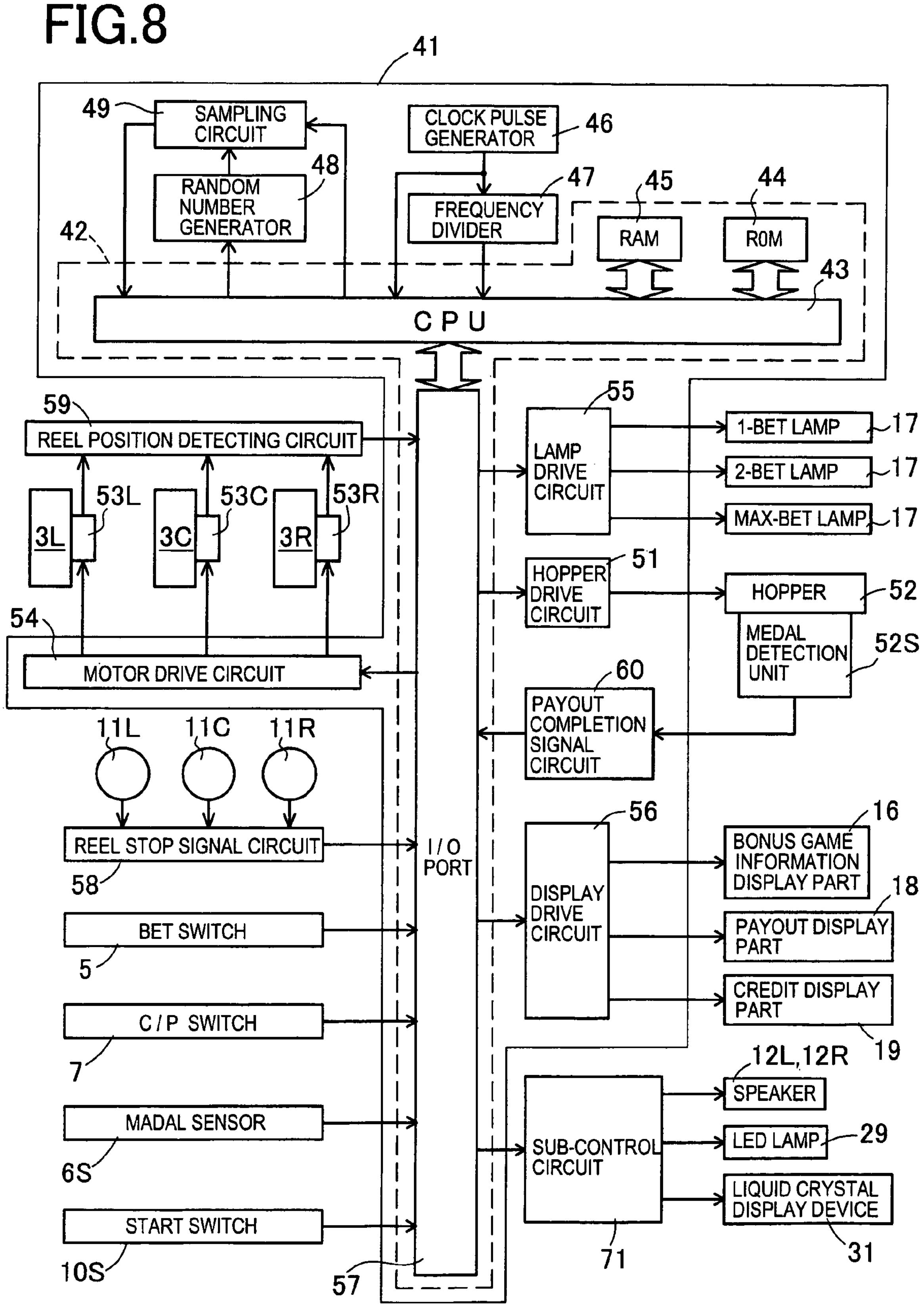
FIG. 8 is a block diagram showing an electrical circuit in the embodiment.

FIG. 8 shows the circuitry construction including a main control circuit 41 for controlling game treatment operation in the gaming machine 1, peripheral devices electrically connected to the main control circuit 41, and a sub-control circuit 71 for controlling the liquid crystal display device 31 and speakers 12L, 12R based on the control command transmitted from the main control circuit 41. The main control circuit 41 and the sub-control circuit 71 construct the game result display control means. The main control circuit 41 has functions as the internal winning combination determination means, the first display control means and the beneficial state producing means. The internal winning combination determination means determines the internal winning combination among plural winning combinations based on the output from the game start instruction means. The first display control means controls the first display means based on the determined result by the internal winning combination determination means and the output by the game result leading means. The beneficial state producing means produces beneficial state for the player when a predetermined game result is displayed on the game result display means. And the sub-control circuit 71 controls the second display means based on the determined result by the internal winning combination determination means and the output from the game result leading means.

The main control circuit 41 is mainly constructed from a microcomputer 42 arranged on the circuit board, in addition to a circuit for sampling random number. The microcomputer 42 includes a CPU 43 conducting control operation according to preset program, a ROM 44 and a RAM 45.

To the CPU 43, a clock pulse generator 46 generating reference clock pulses, a frequency divider 47, a random number generator 48 for generating random numbers sampled and a sampling circuit 49 are connected respectively. Here, as the means for sampling random number, it may construct that random number sampling is done according to the operation program of the CPU 43 in the microcomputer 42. In this case, the random number generator 48 and the sampling circuit 49 may be omitted, or these may be remained to back up random number sampling operation.

In the ROM 44 of the microcomputer 42, there are stored a probability lottery table utilized for judging random number sampling conducted every operation of the start lever 10 (start operation), a stop control table for determining stop combination of the reels according to operation of the stop buttons and various control instructions (commands) to materialize to the sub-control circuit 71. Here, the sub-control circuit 71 never transmits commands, information and the like to the main control circuit 41, but one-way transmission from the main control circuit 41 to the sub-control circuit 71 is only done.

In the circuit of FIG. 8, as main actuators controlled based on control signal from the microcomputer 42, there are various lamps (1-BET lamp 17*a*, 2-BET lamp 17*b*, MAX-BET lamp 17*c*), various display parts (bonus game information display part 16, payout display part 18, credit display part 19), a hopper 52 as the game value giving means (including drive part for payout) accumulating medals and paying out a predetermined number of medals according to instruction by a hopper drive circuit 51 and stepping motors 53L, 53C, 53R for driving the reels 3L, 3C, 3R to be rotated.

A motor drive circuit 54 for driving and controlling the stepping motors 53L, 53C, 53R, a hopper drive circuit 51 for driving and controlling the hopper 52 and a lamp drive circuit 56 for driving and controlling various lamps and a display drive circuit 56 for driving and controlling display parts are connected to the output part of the CPU 43 through an I/O port 57. These drive circuits controls operation in each of the actuators when receiving control commands such as drive commands each of which is output from the CPU 43.

Further, as for the input signal producing means mainly producing input signals which are necessary for the microcomputer 42 to produce the control commands, there are provided the BET switch 5, the medal sensor 6S for detecting the inserted medals, the C/P switch 7, the start switch 10S, the reel stop signal circuit 58, the reel position detecting circuit 59 and the payout completion signal circuit 60. These are also connected to the CPU 43 through the I/O port 57.

The medal sensor 6S detects the medals inserted in the medal insertion slot 6. The start switch 10S detects operation of the start lever 10. The reel stop signal circuit 58 produces stop signal corresponding to operation of each stop button 11L, 11C, 11R. The reel position detecting circuit 59 provides signal to detect the position of each reel 3L, 3C, 3R with the CPU 43 when receiving pulse signal from the reel rotation sensor. The payout completion signal circuit 60 produces signal for detecting the medal payout completion when the count number (corresponding to the medal number paid out from the hopper 52) by the medal detection unit 52S reaches to data of a designated number.

In the circuit shown in FIG. 8, the random number generator 48 generates random numbers within a predetermined numeral range and the sampling circuit 49 conducts sampling of one random number at the suitable timing after the start lever 10 is operated. Based on the thus sampled random number and the probability lottery table stored in the ROM 44, the internal winning combination of the symbols is determined. And after the internal winning combination is determined, sampling of the random number is conducted again to select the "stop control table".

After rotation of the reels 3L, 3C, 3R is started, it is counted the number of the drive pulses each of which is provided with each of the stepping motors 53L, 53C, 53R, and the counted number is written in the predetermined area of the RAM 45. The reset pulse is generated from each of the reels 3L, 3C, 3R every one rotation thereof, and these reset pulses are input to the CPU 43 through the reel position detecting circuit 59. Based on the thus obtained reset pulses, the count number of drive pulses counted in the RAM 45 is cleared to "0". Thereby, in the RAM 45, the count number corresponding to the rotational position within one rotation in each of the reels 3L, 3C, 3R is stored.

In order to connect the rotational positions of the reels 3L, 3C, 3R with the symbols described on the outer peripheries of the reels, a symbol table is stored in the ROM 44. In this symbol table, both code numbers, each of which is serially given every a predetermined rotational pitch of each reel 3L, 3C, 3R by setting the rotational position producing the reset pulse as the reference rotational position, and symbol codes, each of which indicates the symbol provided corresponding to each of the code numbers, are connected with each other.

Further, in the ROM 44, a winning symbol combination table is stored. In the winning symbol combination table, winning symbol combinations corresponding to various winnings, medal payout numbers each of which corresponds to each winning and winning determination codes each of which represents each winning, are corresponded with each other. The above winning symbol combination table is referred when the stop control of the left reel 3L, the center reel 3C and the right reel 3R is conducted and when the winning is confirmed after all reels 3L, 3C, 3R are stopped.

When one of winning combinations is internally won by the lottery treatment (probability lottery treatment) based on the above sampling of the random number, the CPU 43 sends stop signals for conducting stop control of the reels 3L, 3C, 3R to the motor drive circuit 54, based on the operation signals sent from the reel stop signal circuit 58 at the timing that the player operates the stop buttons 11L, 11C, 11R and the selected stop control table.

If the symbols stop in a stop mode that the winning combination internally won is realized, the CPU 43 provides the payout command signal to the hopper drive circuit 51, thereby a predetermined number of the medals are paid out from the hopper 52. At that time, the medal detection unit 52S counts the number of medals paid out, and when the number of medals paid out reaches to the designated number, the medal payout completion signal is input to the CPU 43. Thereby, the CPU 43 stops driving of the hopper 52 through the hopper drive circuit 51, as a result, the payout treatment of the medals is terminated.

Figure 9:
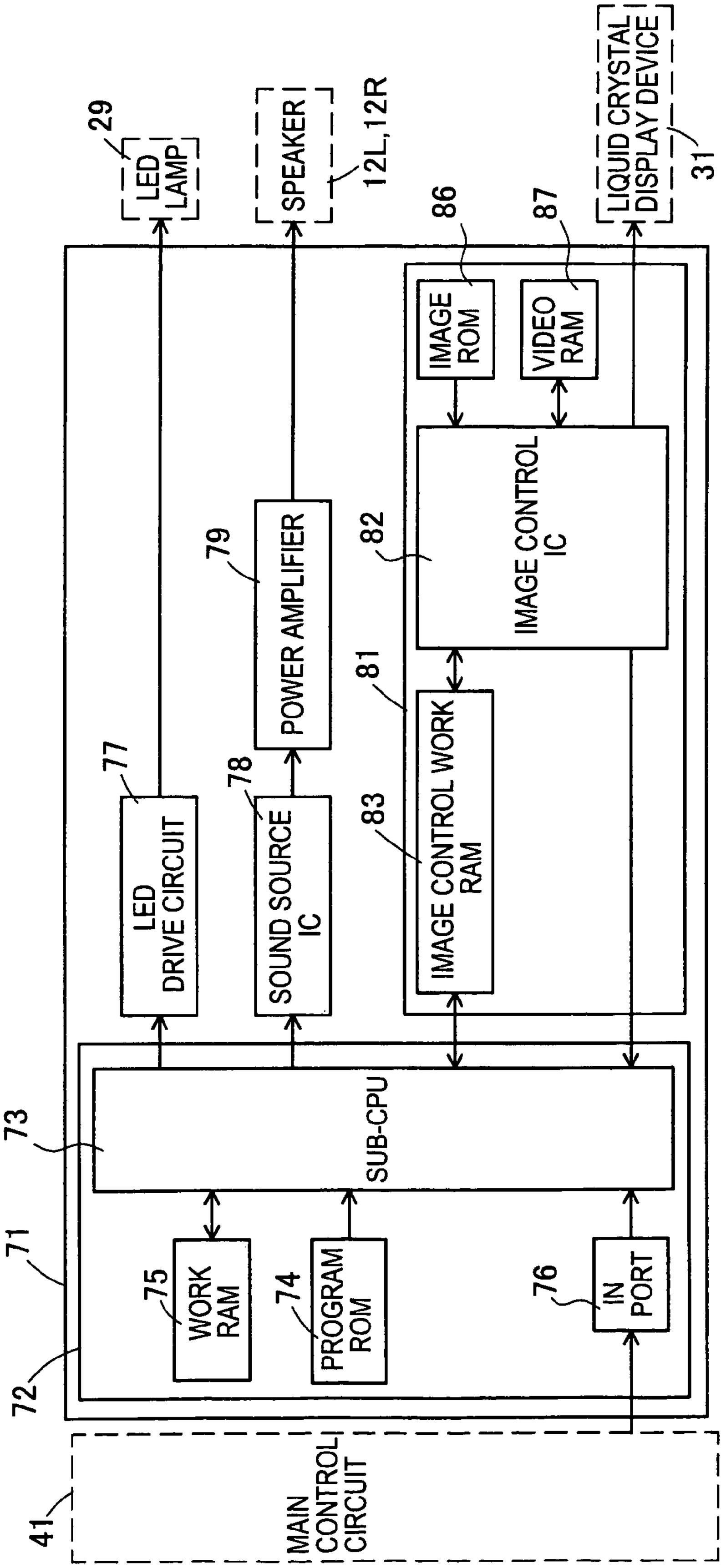
FIG. 9 is a block diagram showing a construction of a sub-control circuit.

FIG. 9 shows a construction of the sub-control circuit 71. The sub-control circuit 71 conducts turning on and off treatment of the LED lamps 29 based on the control command from the main control circuit 41, display control of the liquid crystal display device 31 and output control of sounds output from the speakers 12L, 12R. This sub-control circuit 71 is constructed on a separate circuit board from the circuit board on which the main control circuit 41 is formed and is mainly constructed from a microcomputer (abbreviated as "sub-microcomputer" hereinafter) 72. The sub-control circuit 71 is constructed from a LED drive circuit 77 as the display control means for controlling a plurality of ornamental lamps, the LED lamps 29 and the fluorescent lamps 37*a*, 37*b* which are arranged on the cabinet of the gaming machine 1, an image control circuit 81 as the display control means of the liquid crystal display device 31, a sound source IC 78 for controlling sounds output from the speakers 12L, 12R and a power amplifier 79 acting as the amplifier.

The sub-microcomputer 72 includes a sub-CPU 73 conducting control operation according to the control command sent from the main control circuit 41, a program ROM 74 acting as the memory means and a work RAM 75. Though the sub-control circuit 71 does not have the clock pulse generator, the frequency divider, the random number generator and the sampling circuit, it is constructed so that the random sampling is conducted in the operation program of the sub-CPU 73. And the program ROM 74 stores the control program executed in the sub-CPU 73. Further, the program ROM 74 also stores the image control program concerning with display on the liquid crystal display device 31 and various select tables. The work RAM 75 is constructed as the temporary memory means utilized when the control program is executed by the sub-CPU 73.

The image control circuit 81 is constructed form an image control work RAM 83, an image ROM 86, a video RAM 87 and an image control IC 82. The image control IC 82 determines the display contents displayed on the liquid crystal display device 31 based on parameters designated by the sub-CPU 73. The image control work RAM 83 is used for temporarily storing images when images are formed by the image control IC 82 and when images followingly displayed on the liquid crystal display device 31 are designated to the image control IC 82 by the sub-CPU 73. The image control IC 82 forms images corresponding to display contents determined by the sub-CPU 73 and outputs to the liquid crystal display device 31. The image ROM 86 stores various images to form the images to be displayed. And the video RAM 87 is constructed as the temporary memory means utilized when images are formed in the image control IC 82.

Here, in the embodiment, computer graphics technology for moving images is utilized so as to improve effect ability in the liquid crystal display unit 2*b*. At that time, a part of image data is extracted and superimposing of image data (splite treatment) is done. In order to realize this treatment, splite image data and background image data and the like are stored in the image ROM 86, the splite image data representing persons, animals, marks, letters, figures and figures including areas to which white color is directed (set) to be able to see and recognize variable displaying and displaying in a stop state of the symbols arranged on the reels. The splite image data represents an image which is displayed by being superimposed as the splite display on the background image (background plane). And in the image control work RAM 83, the splite image data displayed on the background image are stored. At that time, if a plurality of splite images (splite planes) are utilized, the splite images are stored according to a priority order (order of the splite image when displayed by superimposing thereof). This priority order is uniformly determined by splite number and becomes former according that the splite number becomes bigger. And in the video RAM 87, it is stored image data corresponding to the image displayed on the liquid crystal display unit 2*b*.

The image control IC 82 produces the image data displayed on the liquid crystal display unit 2*b*, stores such data in the video RAM 87 and displays the stored image data on the liquid crystal display unit 2*b*. Thereby the image control IC 82 controls imaging of the splite image displayed on the background image. Concretely, when the splite image is displayed, the image control IC 82 conducts various treatment such as judgement of the priority order (display priority) of the splite image, transparent judgement, semi-transparent judgement and the like. Further, the image control IC 82 directs the position of the splite image and synthesizes the splite image with the background image at the directed position, thereby displays the splite image. That is to say, the image displayed on the liquid crystal display device 31 (the second display means) is produced by synthesizing plural images based on the priority order. Thereby, data quantity necessary for computer graphics of moving images can be reduced and development of computer graphics of moving images can be easily done.

Further, in the embodiment, computer graphics technology for moving images is utilized so as to improve effect ability in the liquid crystal display unit 2*b*. The image control IC 82 basically produces the image data displayed on the liquid crystal display unit 2*b*, stores such data in the video RAM 87 and displays the stored image data on the liquid crystal display unit 2*b*. Thereby, the image control IC 82 controls imaging of the images displayed on the liquid crystal display unit 2*b*. The images displayed on the liquid crystal display unit 2*b* are stored in the image ROM 86 as data (compressed image data). And image is compressed and stored by data compression method in which play back direction is directed (for example, so-called AVI CINEPACK Compression), and there is a case that image is displayed (enlarged and displayed) by extending (enlarging) thereof and a case that images are displayed without enlarging thereof, when image is played back (in a case that the specific image is displayed on the liquid crystal display unit 2*b*).

In a case that image is enlarged and displayed as moving image, the image control IC 82 intermittently reads out the compressed image data of the image by one frame from the image ROM 86 and serially stores the compressed image data for one frame in the image control work RAM (SDRAM) 83. Further, the image control IC 82 serially conducts extending treatment of the compressed image data for one frame stored in the image control work RAM 83, the data treated by extending treatment are stored in the video RAM 87 and the data stored in the video RAM 87 is displayed on the liquid crystal display unit 2*b*. That is to say, the image control IC 82 has function as enlargement means for executing extending treatment of the compressed image data.

When extending treatment of the compressed image data for one frame is completed by the image control IC 82, the compressed image data for one frame stored in the image control work RAM 83 is not necessary, therefore such data are rewritten by the compressed image data followingly read out from the image ROM 86. Thereby, it can be reduced data quantity of the graphic contents for moving images, such contents being necessary for computer graphics for moving images.

When the image is enlarged and displayed as still image, the image control IC 82 reads out the compressed image data of the image from the image ROM 86 and stores in the image control work RAM 83. Further, the image control IC 82 conducts extending treatment for extending the compressed image data stored in the image control work RAM 83 and displays on the liquid crystal display unit 2*b*.

And, in a case that the image is not enlarged and displayed as still image and moving image, the image control IC 82 as the above mentioned enlarging means reads out the compressed image data of the image from the image ROM 86 and stores in the image control work RAM 83, thereafter displays the compressed image data stored in the image control work RAM 83 on the liquid crystal display unit 2*b* as the image, without extending the compressed image data. That is to say, the image control IC 82 performs function to control imaging of the image displayed on the liquid crystal display unit 2*b*, without performing function as the enlarging means.

Here, in a case that the above mentioned image is enlarged and displayed (enlarging display), such image is utilized as notice image, notice moving image, and if the image is displayed without enlarging thereof, such image is utilized as background image, background moving image.

In the above mentioned image ROM 86, except for the above data of image, for example, the splite image data and background image data and the like are stored, the splite image data being utilized for superimposing (splite treatment) the image data such as persons, animals, marks, letters, figures and figures including areas to which white color is directed (set) to be able to see and recognize variable displaying and displaying in a stop state of the symbols arranged on the reels. And in the video RAM 87, it is stored the image data corresponding to the image displayed on the liquid crystal display unit 2*b*.

Here, in the liquid crystal display unit 2*b* of the embodiment, after it is continued for a predetermined time interval (for example, one minute) a state (abbreviated "non-gaming state" hereinafter) that medal inserting operation and operation of the BET switch 5 (abbreviated as "BET operation" hereinafter) is not conducted after one game is finished (for example, rotation of all reels is stopped), demonstration display (waiting image display) is basically conducted. This demonstration display indicates a display for notifying a state that the gaming machine is in a waiting state for the player. And existence or nonexistence of the demonstration display and display patterns (modes) are changed according to the internal winning combination and the like. Hereinafter, "demonstration" is abbreviated as "demo".

Figure 10:
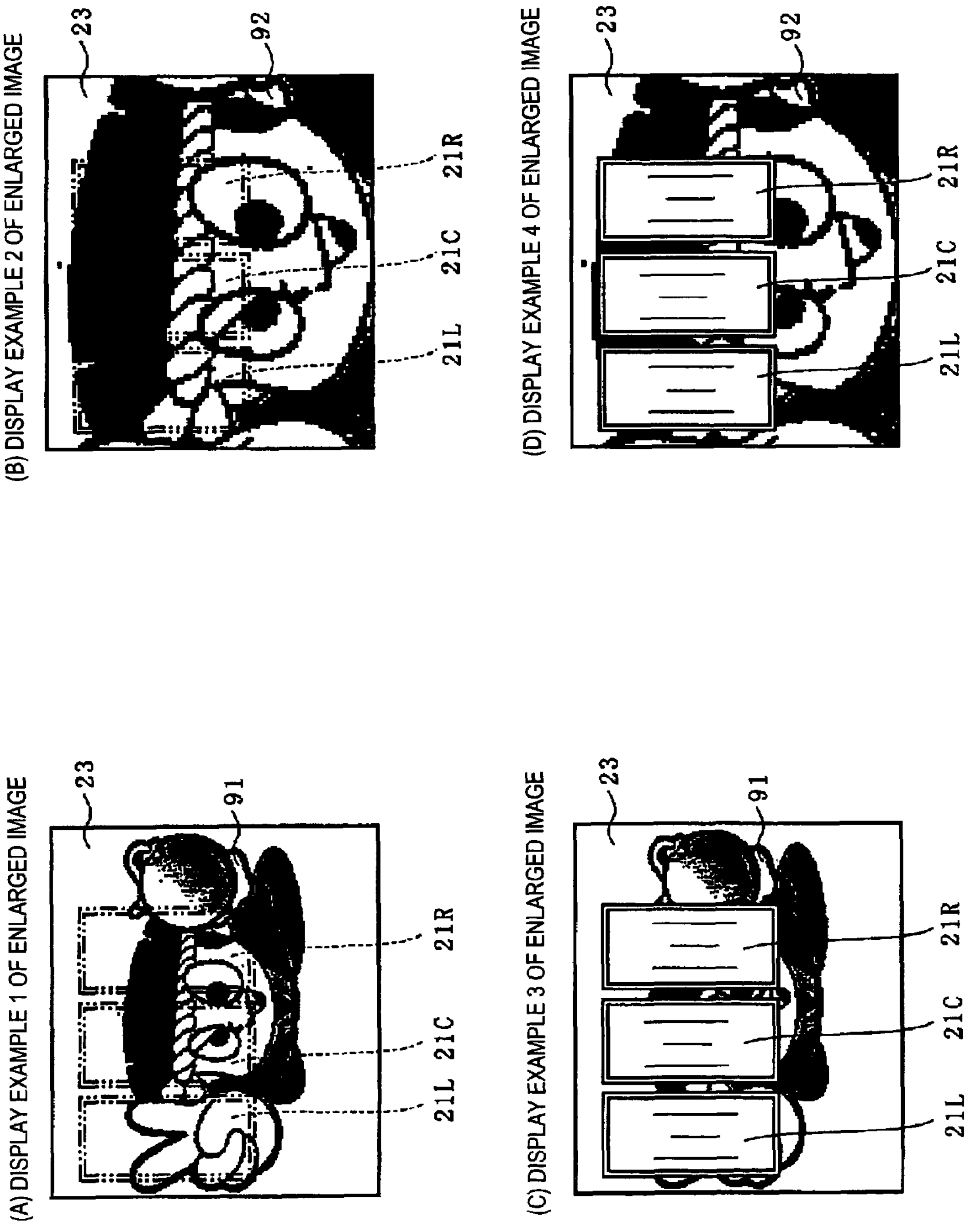
FIG. 10 is a view showing display examples of the liquid crystal display unit.

FIG. 10 shows display examples of the image displayed on the liquid crystal display unit 2*b*. FIG. 10(A) shows an enlarging display mode of the image displayed in a case that gaming state is shifted to the non-gaming state, without materializing the specific winning combination (for example, RB) after the start operation is done and RB is determined as the internal winning combination. As shown in FIG. 10(A), in the second display means (liquid crystal display device 31) arranged toward the player's side when seeing the front side of the gaming machine, the specific image is displayed over substantially whole display area of the second display means including the symbol display areas based on the determined result by the internal winning combination determination means. Thereby, it can conduct effect display with impact through which the player's expectation for occurrence of the beneficial state is remarkably raised. And interest for games is very raised. Further, there is less probability for the player to miss the above image display.

Here, Donchan 91, which is the character (appearing object) concerning with the theme of the gaming machine 1, is continuously and seamlessly displayed over substantially whole of the liquid crystal display unit 2*b* (over the symbol display areas, the window frame display area and effect display area). Thereby, effect with impact can be realized. As mentioned, in the second display means (liquid crystal display device 31) arranged toward the player's side when seeing the front side of the gaming machine, the specific image is displayed over substantially whole display area of the second display means including the symbol display areas, therefore the specific image is displayed with impact and there is less probability for the player to miss the specific image. Thus, it can be conducted effect display with remarkably high effect. Here, the image displayed over whole of the liquid crystal display unit 2*b* is defined as "specific image". And utilizing the Donchan 91 as the background image, it may be conducted the effect by various image display. As mentioned, the player can recognize that RB is determined as the internal winning combination, based on that the Donchan 91 is enlarged and displayed.

FIG. 10(B) shows an enlarging display mode of the image (specific image) displayed in a case that gaming state is shifted to the non-gaming state, without materializing the specific winning combination (for example, BB) after the start operation is done and BB is determined as the internal winning combination.

Here, Donchan 92, which is obtained by further enlarging the Donchan 91, is continuously and seamlessly displayed over substantially whole of the liquid crystal display unit 2*b*. Concretely, the Donchan 92 (displaying object) is enlarged and displayed so that whole of the Donchan 92 cannot seen and recognized. That is to say, the player can see and recognize only a part of the Donchan 92. Here, utilizing the Donchan 92 as the background image, it may be conducted the effect by various image display. As mentioned, the player can recognize that BB is determined as the internal winning combination, based on that the Donchan 92 is enlarged and displayed.

As mentioned, when the gaming state is shifted to the non-gaming state, the enlarging display mode of the specific image is made different according to the determined internal winning combination, thereby the player's expectation for games can be changed by stages.

FIG. 10(C) shows an enlarging display mode of the image (specific image) displayed in a case that the specific winning combination (for example, RB) is determined as the internal winning combination after the start operation is conducted. Here, as shown in FIG. 10(C), the Donchan 91 is displayed as the background image of the symbol display areas 21L, 21C, 21R and the above mentioned window frame display area 22L, 22C, 22R. Concretely, the Donchan 91 is enlarged and displayed in the liquid crystal display area 2*b,* white color is directed to the symbol display areas 21L, 21C, 21R and the predetermined color except for the transparent color is directed to the window frame display areas 22L, 22C, 22R.

White color is realized by forming a state that liquid crystal of the area in the liquid crystal panel 34, the area corresponding to the above mentioned light transmittable part, is not driven. Thereby, the player can clearly see and recognize variable display and stop display of the symbols arranged on the reels 3L, 3C, 3R in the symbol display areas 21L, 21C, 21R corresponding to the light transmittable part to which white color is directed. That is to say, the player can clearly see and recognize the symbols within the window frame display areas 22L, 22C, 22R, and can see and recognize the Donchan 91 (a part of the Donchan 91 in the shown example). Here, it may be conducted effect by various image display in the effect display part 23 by utilizing the Donchan 91 as the background image.

As mentioned above, based on that the Donchan 91 is enlarged and displayed, the player can recognize that RB is determined as the internal winning combination.

FIG. 10(D) shows an enlarging display mode of the image (specific image) displayed in a case that the specific winning combination (for example, BB) is determined as the internal winning combination after the start operation is conducted. Here, the above mentioned Donchan 92, which is formed by further enlarging the Donchan 91, is displayed as the background image of the symbol display areas 21L, 21C, 21R and the above mentioned window frame display areas 22L, 22C, 22R. Concretely, the Donchan 92 is enlarged and displayed in the liquid display unit 2*b,* white color is directed to the symbol display areas 21L, 21C, 21R and the predetermined color except for transparent color is directed to the window frame display areas 22L, 22C, 22R. Further, the Donchan 92 is enlarged and displayed so that whole Donchan 92 cannot be seen and recognized. That is to say, only a part of the Donchan 92 can be seen and recognized. Here, it may be conducted effect by various image display in the effect display part 23 by utilizing the Donchan 92 as the background image. As mentioned, the player can recognize that BB is determined as the internal winning combination, based on that the Donchan 92 is enlarged and displayed.

As mentioned, when the gaming state is shifted to the non-gaming state, the enlarging display mode of the specific image is made different according to the determined internal winning combination, thereby the player's expectation for games can be changed by stages. And the player can conduct "press of stop button for a desirable symbol while seeing thereof", after determining the symbol to be stopped.

Here, image data of the Donchan 91 and the Donchan 92 is constructed from 3D shape data having coordinate points X, Y, Z for defining shape of object, and is represented as the data indicating 3D shape polygon.

And, it may be constructed so that the specific image is enlarged and displayed in time series (by stages according to time elapse or continuously) from the enlarging display mode of the image shown in FIG. 10(A) to the enlarging display mode shown in FIG. 10(B). In detail, if the start operation is done, the specific winning combination (for example, BB) is determined as the internal winning combination, and the gaming state is shifted to the non-gaming state without materializing BB, at first, the Donchan 91 is enlarged and displayed as shown in FIG. 10(A). Thereafter, the Donchan 91 is further enlarged to the Donchan 92 in time series, thus the Donchan 92 is displayed as shown in FIG. 10(B). And the specific image may be reduced and displayed from the Donchan 92 shown in FIG. 10(B) to the Donchan 91 shown in FIG. 10(A). Thereby, profound effect can be obtained. Further, velocity or direction of change in enlarging display or reduction display may be changed. Thereby, further profound effect can be obtained.

Further, the above mentioned change in time series of enlarging display can be utilized in a case that the specific image is enlarged and displayed in time series from an enlarging display mode of image shown in FIG. 10(C) to an enlarging display mode shown in FIG. 10(D). In this case, if the start operation is done and the specific winning combination (for example, BB) is determined as the internal winning combination, profound effect can be obtained by changing of the enlarging display in time series as mentioned. And expectation for games can be given to the player.

Further, it may be conceivable that it is provided another display means (display means using the ornamental panel 13*b* (see FIG. 11) with light transmittability as the display plane) except for the above mentioned reels 3L, 3C, 3R and the liquid crystal display device 31, the another display means being arranged behind the ornamental panel 13*b* when seeing the front side of the gaming machine, and various effect display is conducted by the another display means. In this case, the another display means is constructed from light transmittable member so that the player can transmittably see and recognize display contents of the another display means through the ornamental panel 13*b*.

Next, with reference to FIGS. 11, 12, 13 and 14, it will be described cases that the specific image shown in FIG. 10 is displayed over the above another display means. FIGS. 11, 12, 13 and 14 show display examples of images shown in the liquid crystal display unit 2*b* and in the another display means.

Figure 11:
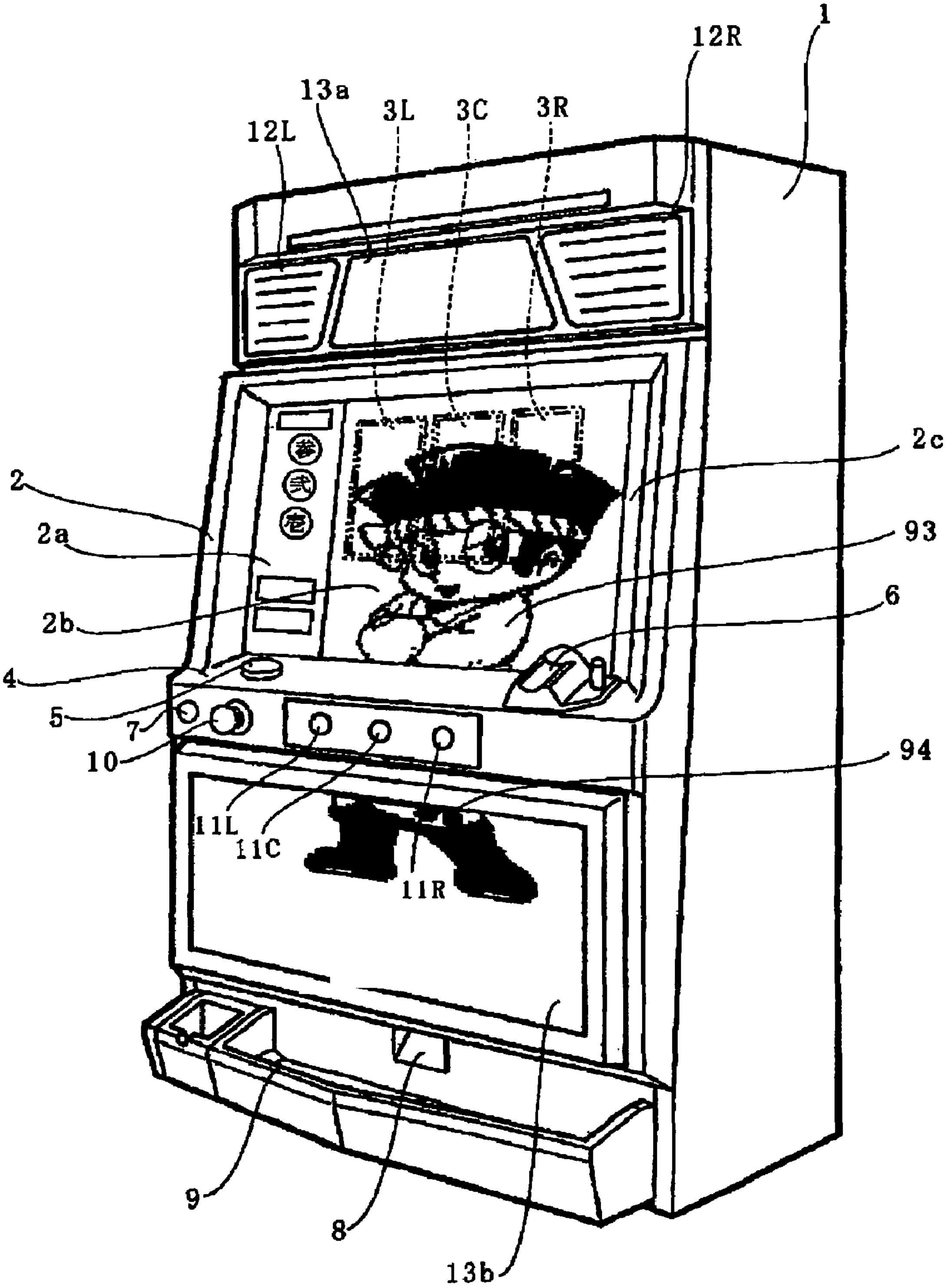
FIG. 11 is a view showing display examples of the liquid crystal display unit and the ornamental panel.

FIG. 11 shows an enlarging display mode of image displayed in a case that the start operation is done, the specific winning combination (for example, RB) is determined as the internal winning combination and the gaming state is shifted to the non-gaming state without materializing RB.

Here, the Donchan 93 (character) who crosses both arms is seamlessly displayed over substantially whole of the liquid crystal display unit 2*b* (over the symbols display areas, the window frame display areas and the effect display area). And, the image displayed on the another display means is the image displaying the lower body 94 of the above Donchan 93. That is to say, it is constructed so that one still image or moving image can be displayed by combining the image displayed on the liquid crystal display unit 2*b* and the image displayed on the another display means. Here, the liquid crystal display unit 2*b* and the another display means display images having relevance with each other. Thereby, effect with impact can be realized. Here, in the embodiment, though the still image is utilized, the present invention is not limited to this case. The moving image may be displayed. And it may be conducted effect by various image display by utilizing the Donchan 93 and the lower body 94 of the Donchan 93 as the background image.

Figure 12:
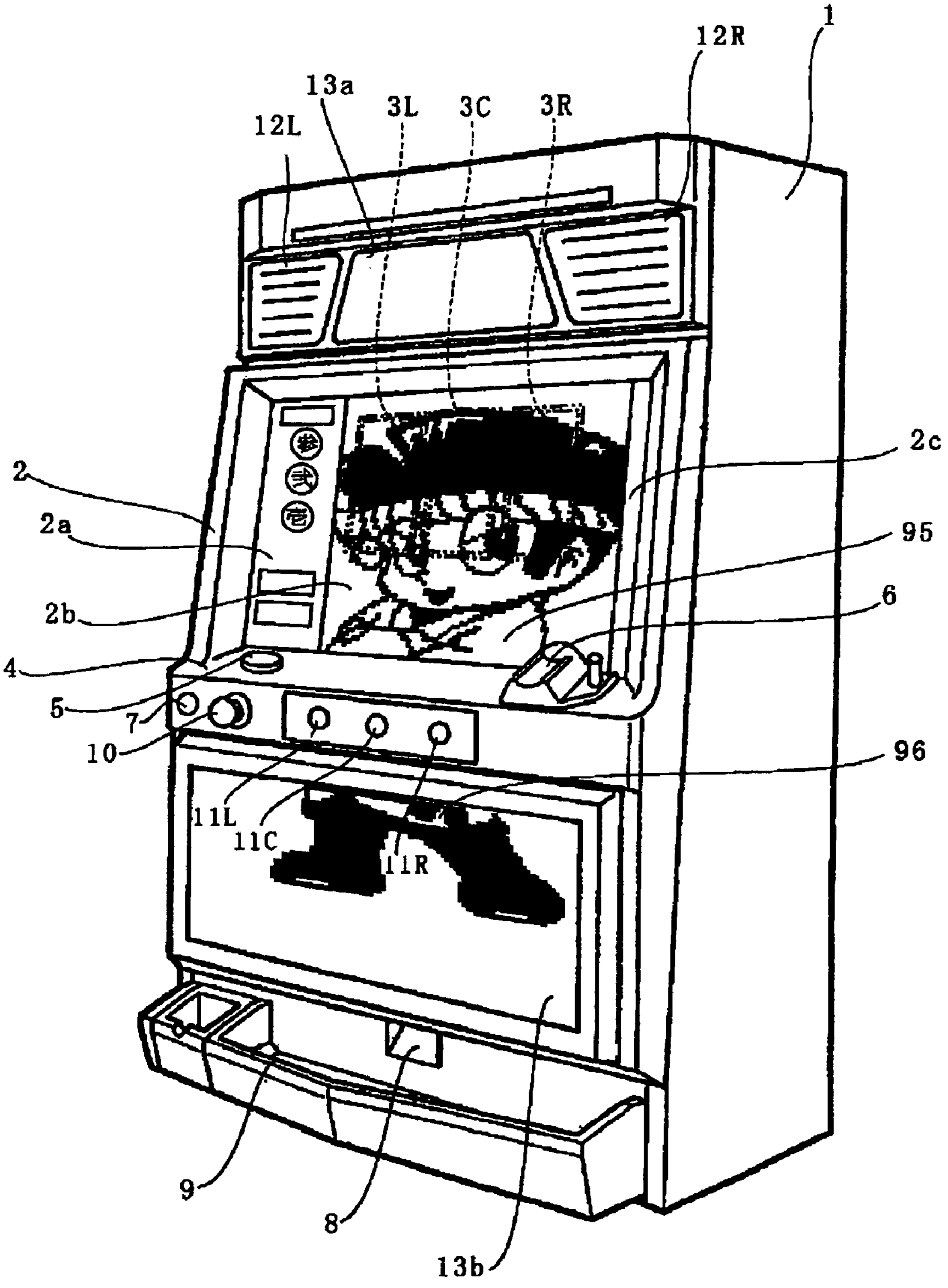
FIG. 12 is a view showing a display example of the liquid crystal display unit and the ornamental panel.

FIG. 12 shows an enlarging display mode of the image (specific image) displayed in a case that the start operation is done, the specific winning combination (for example, BB) is determined as the internal winning combination and the gaming state is shifted to the non-gaming state without materializing BB.

Here, the Donchan 95 which is formed by further enlarging the Donchan 93 is displayed on whole of the liquid crystal display unit 2*b*. Concretely, the Donchan 95 is enlarged and displayed so that whole of the Donchan 95 cannot be seen and recognized. That is to say, only a part of the Donchan 95 can be seen and recognized. And the image displayed on the another display means is the image indicating the lower body 96 of the Donchan 95.

Figure 13:
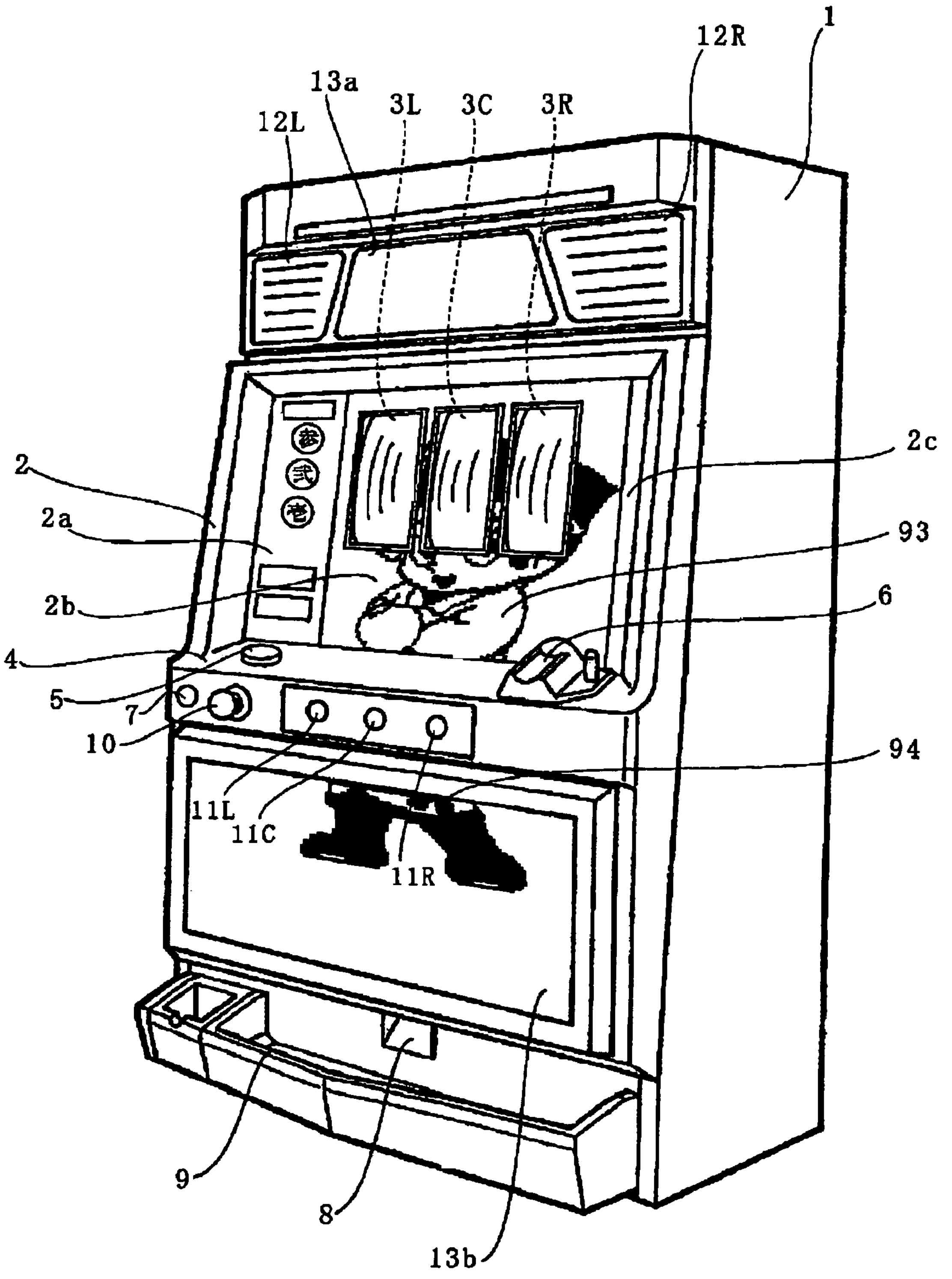
FIG. 13 is a view showing a display example of the liquid crystal display unit and the ornamental panel.

FIG. 13 shows an enlarging display mode of the image displayed in a case that the start operation is done and the specific winning combination (for example, RB) is determined as the internal winning combination. Here, as shown in FIG. 13, the Donchan 93 is displayed as the background image of the symbol display areas 21L, 21C, 21R and the above mentioned window frame display areas 22L, 22C, 22R. And the image displayed on the another display means is the image indicating the lower body 94 of the Donchan 93.

Figure 14:
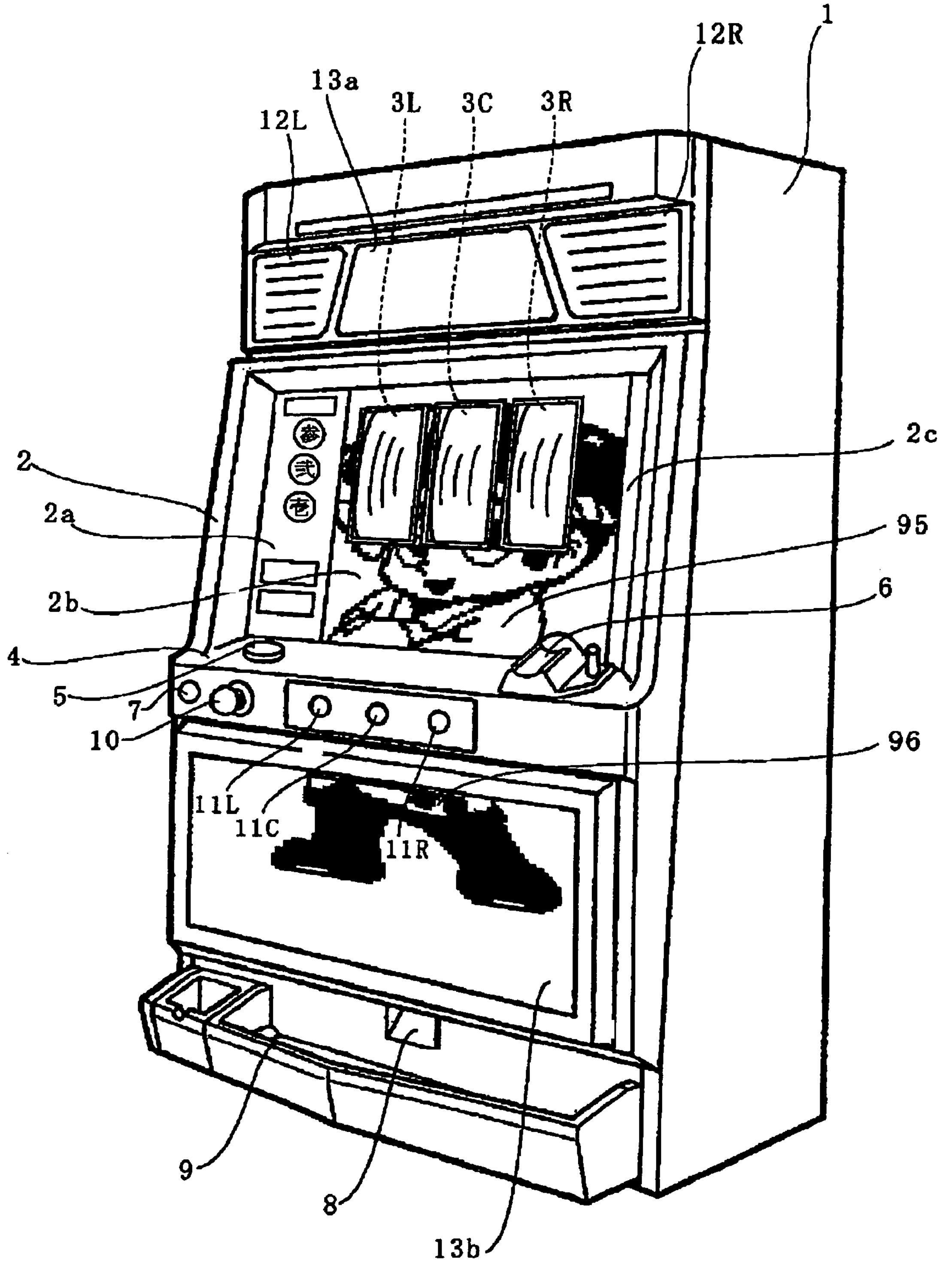
FIG. 14 is a view showing a display example of the liquid crystal display unit and the ornamental panel.

FIG. 14 shows an enlarging display mode of the image (specific image) shown in a case that the start operation is done and the specific winning combination (for example, BB) is determined as the internal winning combination. Here, the Donchan 95 which is formed by further enlarging the Donchan 93 is displayed as the background image of the symbol display areas 21L, 21C, 21R and the above mentioned window frame display areas 22L, 22C, 22R. The image displayed on the another display means is the image indicating the lower body 96 of the Donchan 95.

Further, it may be conceivable that it is provided further another display means except for the above mentioned reels 3L, 3C, 3R, the liquid crystal display device 31 and the another display means, the further another display means being arranged behind the payout table panel 13*a* when seeing the front side of the gaming machine, and various effect display is conducted by the further another display means. In this case, the further another display means has the same construction as that of the above mentioned liquid crystal display device 31 and the payout table panel 13*a* is constructed from light transmittable member so that the display contents of the further another display means can be seen and recognized through the payout table panel 13*a*. And it may be constructed so that one still image or moving image can be displayed by combining the image displayed on the liquid crystal display unit 2*b*, the image displayed on the another display means and the image displayed on the further another display means.

As mentioned, although description is done according to the embodiment, the present invention is not limited to these cases.

In the embodiment, although the internal winning combination is adopted as the information concerning with games and the specific image is displayed, the present invention is not limited to this. For example, the beneficial state can be utilized as the information concerning with games, the information concerning with the winning combination carried over, and the information concerning with games indicating that the materialized winning combination is the specific winning combination. And as the information concerning with games, it can be utilized the internal winning number of the predetermined winning combination (for example, BB, RB, single bonus, small combination, replay and the like) or materializing number of the predetermined winning combination. As mentioned, it is displayed based on the information concerning with games the specific image over substantially whole display area including the symbol display areas in the second display means (liquid crystal display device 31) which arranged toward the player's side when seeing the front side of the gaming machine. Thereby, effect display with impact and remarkably high effect can be conducted. And there is less probability for the player to miss the specific image. Further, interest for games can be raised.

Further, the probability with which the specific image is displayed when the specific winning combination is internally won can be made higher, in comparison with the probability in a case that another winning combination other than the specific winning combination is internally won. Thereby, reliable degree for the specific image corresponding to that the specific winning combination is internally won becomes high, thus the player can progress games while expecting that the specific image will be displayed. That is to say, the probability with which the specific image is displayed when the specific winning combination is determined as the internal winning combination, is controlled so as to become higher than the probability with which the specific image is displayed when the other winning combination other than the specific winning combination is determined as the internal winning combination. Thereby, the player can be strongly conscious of expectation for occurrence of the beneficial state when seeing the specific image. And if the specific image is displayed when the other winning combination different from the specific winning combination is determined as the internal winning combination, it can be increased chances to display the specific image with impact, effect can be raised and interest for games can be improved.

Further, if the specific image is displayed based on that "the materialized winning combination is the specific winning combination" which included in the information concerning with games, the specific image is displayed over substantially whole display area including the symbol display areas of the second display means (liquid crystal display device 31), which is arranged toward the player's side when seeing the front side of the gaming machine. Thereby, the player can obtain accomplishing feelings and it can be aroused feelings that the player wants to play games while intending to materialize the specific winning combination in order to again see the specific image. As a result, it can be realized effect having very (remarkably) visual and high effect.

And in the embodiment, although the character is wholly displayed on the liquid crystal display unit 2*b* and the ornamental panel 13*b* (images with mutual relevance are displayed), the present invention is not limited to this. For example, images with mutual relevance can be displayed by displaying a state that the predetermined display object is moved from the liquid crystal display unit 2*b* to the ornamental panel 13*b* or from the ornamental panel 13*b* to the liquid crystal display unit 2*b*. Thereby, effect display with more impact can be realized. As mentioned, the another display means except for the first and second display means is provided and the second display means and the another display means display images with mutual relevance. Accordingly, the display area becomes larger and effect with further impact can be done. And the player can see and recognize the images with mutual relevance at places apart from the gaming machine, it can make the player have interest for the gaming machine, as a result, interest for games can be improved.

In the embodiment, although the above mentioned specific image is displayed when the gaming state is shifted to the non-gaming state and the specific winning combination (BB, RB) is determined as the internal winning combination, the present invention is not limited to this. The specific image may be displayed while backup restoration display (including cases that backup is restored and finished), while power of the gaming machine is turned on (including time that power is turned on and time after power is turned on), while bonus game (including times that bonus game is started and finished), while the beneficial state (including time that the beneficial state is started and finished).

Further, although the above mentioned specific image is still image, the present invention is not limited to this. The specific image may be moving image. The compressed data of moving image may be compressed according to the manner that trick mode playback such as rapid playback, slow playback, reverse playback can be done when playing back the compressed data. And the specific image may be displayed by moving image which is moved by setting the symbol display areas or periphery thereof as the base point of display start. For example, it may be constructed as follows. That is, an initial image is displayed in the symbol display areas or the area including symbol display areas at the predetermined timing, the initial image is gradually enlarged and displayed, thereafter the initial image is variably displayed so as to become the image over substantially whole display area of the second display means. If the initial image is, for example, displayed by superimposing the image substantially same as the image stopped and displayed on the first display means to the second display means, it can be obtained effect as if the symbol of the first display means is gradually enlarged, thereby effect with very high effectiveness can be done. Thereby, since it can be realized relevance (integrative ability) between the display mode of the first display means and the display mode of the second display means, effect can be raised. Further, the payout table panel 13*a* may be utilized as the display plane of the another display means. And as the specific image, it may be displayed the image over substantially whole display area of the second display means and the another display means (for example, substantial whole of the another display means).

Further, in the embodiment, although the Donchan, which is the character concerning with the theme of the above gaming machine 1, is utilized as the specific image, the present invention is not limited to this. It can be utilized the image concerning with the specific winning combination (for example, the image including still image or moving image constructed from symbol, letter, figure, mark, character and the like), the image to inform information concerning with games (for example, the image including still image or moving image constructed from symbol, letter, figure, mark, character and the like). Further, as the specific image, it can be utilized any of 2D image and 3D image.

Further, light transmittability of a part of or substantial whole of the symbol display areas 21L, 21C, 21R may be raised (light transmittability may be made high) and the specific image may be formed (realization of display) by both the first display means and the second display means. For example, if it is constructed so that the still image of the first display means is combined and harmonized with the image display (still image or moving image), effect display of the image with presence can be further conducted. Further, for example, it may be constructed so as to display one display object (image) by utilizing both the variable display or stop display (stopped symbols) of the reels (first display means) and display image of the liquid crystal display device 31 (second display means).

And in the embodiment, though the reels 3L, 3C, 3R are adopted as the first display means (constructed so as to include plural symbol display parts (reel sheet and the like) capable of conducting variable display or stop display of one or plural symbols) and the liquid crystal display device 31 is adopted as the second display means, the present invention is not limited to this. For example, CRT, LCD, plasma display, 7-segment LED, LED dot-matrix, lamp, LED, fluorescent lamp, organic EL display, disc, electronic paper, flexible LED, flexible liquid crystal, liquid crystal projector, FED and the like can be adopted as the first display means, the second display means or the third display means. Further, the third display means different from the first display means and the second display means can be arranged at a more front side than the second display means when seeing the front side of the gaming machine, between the first display means and the second display means, or at a more rear side than the first display means when seeing the front side of the gaming machine. The display result displayed on the first display means, the second display means or the third display means is constructed from still images or moving images. The combination, in which two or more or all of the first display means, the second display means and the third display means are combined, can be integrally constructed. In this case, there may be a case that the unit integrally constructed can be wholly exchanged, and this case is preferable since time and labor for decomposing work or assembling work thereof can be omitted and maintenance work can be improved. Further, if parts and construction can be commonly used in the unit, this case is preferable since it can contribute to cost reduction. Of course, if the illumination means commonly utilizable for the common illumination means is included in the unit, the same effect similar to the above can be expected.

Further, the beneficial state includes: a state that a predetermined combination (for example, replay, BB, RB, small combination, single bonus and the like) is materialized; free game; a state that information necessary for the player to favorably advance the game is notified; a state that probability to get internal winning of a predetermined combination is high; a state that winning of a predetermined combination is materialized with high probability; winning of a predetermined combination or a predetermined combination carried over is permitted to materialize with high probability; so-called "challenge time" that the reels are basically stopped based on the operation timing of the stop buttons by the player; small combination; medium combination; big combination; combination (state that so-called "symbol start opening" (symbol variable movement is started when a ball enters in the symbol start opening) is opened or enlarged; so-called "probability changing state", so-called "time shortening state"); or combination of the above states. Here, the small combination, the medium combination and the big combination concern with a state that so-called "big winning opening" is opened in the so-called Japanese Pachinko gaming machine.

And when the internal winning combination determination means determines a predetermined combination (for example, bonus) as the internal winning combination, one or plural or all of the illumination means included in the common illuminations means can be turned off. For example, the LED lamps 29 arranged for each of the reels 3L, 3C, 3R can be turned off every the operation button corresponding thereto is operated or every the operation button other than the above operation button is operated. Based on the above constructions, interest for games increases. And the forward illumination means (the fluorescent lamps 38*a*, 38*b*) can be provided for each of the symbol display parts (the reel 3L, 3C, 3R).

Further, one or plural or all of the illumination means included in the common illumination means can be constructed so as to variably display. For example, still images or moving images can be displayed on the first display means (reel sheet) by changing the turning on mode of the LED lamps 29 or light colors emitted therefrom or by continuously changing those. And self-emitting type plasma display, organic EL display and the like may be adopted as the illumination means (one example of the third illumination means), thereby images can be displayed on the first display means. By this constructions, interest for the game increases.

In a case that the special game result (for example, the symbol combination indicating that bonus winning is materialized) is displayed on the first display means or the second display means, it can be provided the special gaming state producing means that the beneficial state for the player is displayed thereon. And both the special gaming state producing means and the second display means can be formed on single control circuit board. And the gaming state can be displayed by superimposing the images displayed on the first display means and the images displayed on the second display means. Further, based on the trigger that a predetermined state is realized, the effect display on the second display means can be done so as to avoid the specific symbols stopped and displayed on the symbol display part or so as to superimpose the specific symbols. If the gaming state is displayed by the superimposed images, the beneficial state for the player may be produced with high probability in comparison with the case in which the superimposed images is not displayed. Thereby, it can include the effect that the player's expectation increases, in excess of the previous case. Thus, such effect can contribute to increase of interest.

In the embodiment, though the start lever 10 is adopted as the game start instruction means, the present invention is not limited to this. For example, the BET switch 5, the medal insertion slot 6, the medal sensor 6S or the start switch 10S can be adopted.

The display includes: display by the sense of sight, display by the sense of hearing, notification by the sense of smelling, turning on of the lamps or combination of those. The display mode includes: colors, patterns, shapes (outline shapes, interior shapes) and the like. And the game result can be displayed after operation of the game start instruction means or the game result leading means.

And the specific image may be displayed by making light transmittability in the symbol display areas low (hard for the player to see and recognize) when the game result leading means lies in a state that variable display of the symbols can be stopped (state that the stop buttons are permitted to operate) or while the first display means conducts variable display (moving display). That is to say, deep color (except for non-transparent color such as transparent color, semi-transparent color) may be adopted as the color directed to the image (for example, splite image) displayed on the liquid crystal display device 31, corresponding to the symbol display areas 21L, 21C, 21R. In this case, it can be surely given to the player the expectation whether the beneficial state may be occurred or not, therefore it can be desired that effect is remarkably improved.

In the embodiment, though the above mentioned LED drive circuit is utilized as the display control means for a plurality of the ornamental lamps, the LED lamps and the fluorescent lamps, each of which is arranged in the cabinet, the present invention is not limited to this. Turning on control of the LED lamps may be conducted by another display control means. In this case, for example, in turning on control of the LED lamps, electric power may be provided so that the LED lamps are always turned on during a period from power-on of the gaming machine till power-off thereof. Here, turning on includes blinking mode that the LED lamps are intermittently blinked with a very short time interval. Thus, since the LED lamps are always turned on, light emitted from the LED lamps always illuminates each symbol display area even if abnormality occurs in the mentioned LED drive circuit. Thereby, the player can always see the symbols arranged on each of the reels through the each symbol display areas, thus the above turning on control is preferable.

Further, turning on control of the above mentioned fluorescent lamps may be done by another display control means. In this case, for example, in the turning on control of the fluorescent lamps, electric power may be provided so that the fluorescent lamps are always turned on during a period from power-on of the gaming machine till power-off thereof. Thereby, similar to the above, light emitted from the fluorescent lamps always illuminates each symbol display area even if abnormality occurs in the mentioned LED drive circuit. Thereby, the player can always see and recognizes the symbols arranged on each of the reels through the each symbol display areas Further, in the embodiment, though the above mentioned sub-CPU conducts display control of a plurality of the ornamental lamps arranged in the cabinet, sound output control and image display control of the liquid crystal display device, the present invention is not limited to this. Another sub-CPU separate from the above sub-CPU may conduct the above various controls. For example, in a case that another sub-CPU separate from the above sub-CPU conducts the control of a plurality of the ornamental lamps arranged in the cabinet and, for example, in a case that abnormality occurs in the display control, it is enough to exchange only the sub-CPU with abnormality occurrence or only the circuit construction including the sub-CPU with abnormality occurrence to the normal sub-CPU or circuit construction having the normal sub-CPU. Therefore, time and labor for removing the cause of the abnormality occurrence can be omitted and such construction is very preferable. And in a case that another sub-CPU other than the above sub-CPU conducts sound output control or image display control, or for example, in a case that abnormality occurs in the sound output control or the image display control, it is enough to exchange only the sub-CPU with abnormality occurrence or only circuit construction including the sub-CPU with abnormality occurrence.

Further, the liquid crystal display device described in the embodiment may have image enlarging means for enlarging the input images by a predetermined magnification. For example, the image enlarging means may convert the image data for 640×480 dots into the image data for 1024×768 dots and output the converted image data to the display part (above mentioned terminal part). Thereby, it can use the image data for small display area, the data quantity thereof being less in comparison with that for the factual display area. As a result, memory quantity of the ROM and image data forming time can be reduced.

And in the embodiment, though the symbol display area is divided corresponding to each of three reels 3L, 3C, 3R, the present invention is not limited to this and the symbol display area may be formed so as not to be divided. That is, one symbol area or three symbol display splite images (predetermined images) to which the color, other than the transparent color such as white color and semitransparent color, is directed may be provided and one symbol display area may be provided. This symbol display area may be deformed (variably displayed) so that the size thereof is changed (enlarged, reduced). For example, it may be conceivable that two or three of the reels 3L, 3C, 3R can be seen and recognized through one symbol display area. And if the first display means and the third display means are arranged at the rear face or side of the second display means, it may be constructed that the player sees and recognizes through one symbol display area a part or whole of the first display means and a part or whole of the third display means. When the reflection means is produced, there may be a case that the reflection means can be easily produced in comparison with a case that a plurality of transparent portions are formed dividedly. And the first display means or the third display means may be movable such as movement to up and down directions and to left and right directions, reciprocal movement, induced vibration or rotation. In this case, the symbol display area may be constructed so as to move corresponding to mobility thereof. By these movements, profound effect can be expected and there may be a case that such movements can be adopted for relevance of games Further, the present invention can apply to Japanese Pachinko gaming machine, arrange ball gaming machine, mah-jong ball gaming machine, video-slot machine, video poker machine and the other machines, in addition to the slot machine in the embodiment. And even in the game program imitatively executing operation of the above mentioned slot machine in a family gaming machine, the present invention can apply and execute the game. In this case, CD-ROM, FD (flexible disc) and the similar memory medium can be utilized for the memory medium for storing the game program.

Here, recently in the Japanese Pachinko gaming machine in the main current, the gaming machine, in which an electric display device such as the liquid crystal display device is arranged at the center of gaming plate, is popularized. In this electric display device, a plurality of symbols (abbreviated as "special symbols" hereinafter) represented by images are variably displayed, thereby three lines of reels in the slot machine are imitatively displayed. When variable display of the special symbols stops and a predetermined stop mode (in which the same special symbols stop such as 7-7-7 and this stop mode is generally called "big combination"), the game shifts to the special gaming state beneficial for the player. In general Japanese Pachinko gaming machine, the variable display of the special symbols is started on condition that balls shot within the gaming plate by operation of the shooting handle enter into a predetermined winning hole (so-called "variable display start hole"). After a predetermined time is elapsed the variable display of the special symbols stops.

In this kind of Japanese Pachinko gaming machine, it may be arranged the liquid crystal display device (the second display means) and the first display means (for example, drum-type reels) at a more rear side than the display area (display plane) of the liquid crystal display device when seeing the front side of the gaming machine. And the special symbols may be variably displayed on one or both of the first display means (for example, the liquid crystal display device) and the second display means (for example, drum-type reels).

The above mentioned game result display means may be constructed so as to include the first display means and the second display means provided at a more front side than the display area of the first display means when seeing the front surface of the gaming machine. And the game result display means may be constructed so as to include the first display means and the second display means provided at a more front side than the display area of the first display means when seeing the front side of the gaming machine.

The above mentioned rearward illumination means illuminates the second display means from the backside thereof. And the above mentioned forward illumination means illuminates the second display means from the backside of thereof. And the forward illumination means may illuminate the second display means from the side plane thereof.

The above mentioned first display means and/or the second display means may be formed in a curved shape. As for extent of the curvature, the first display means and the second display means may have substantially the same curvature. Thereby, there may be a case that design of the gaming machine is improved and the gaming machine is made attractive. Even if the first display means is curved with a small radius of curvature or with a large radius of curvature, the above same effect can be obtained.

The above mentioned reflection means corresponds to means which has at least function to refract a part or whole of light led by the light leading means toward the liquid crystal panel and illuminate the liquid crystal panel.

The above mentioned game start instruction means may be a variable symbol display start hole which produces an output signal when the winning combination or passage of the ball is detected. The game start instruction means in the ball flipping machine corresponds to the variable display start hole for the special symbols (or the start gate for the special symbols), the variable display start hole for the common symbols (the start gate for the common symbols), the various judging symbol display start holes (or the start gates for the judging symbols).

In a case that the above mentioned internal winning combination determination means determines the predetermined combination as the internal winning combination, one or plural illumination means included in the common illumination means is/are turned off. Or the illumination means may always be turned off.

There may be a case that one or plural illumination means included in the common illumination means is/are turned off at the substantially same timing that the above mentioned internal winning combination determining means determines the predetermined combination as the internal winning combination. Or the illumination means may always be turned off.

As for variable display by the illumination means included in the common illumination means, it is conceivable various display modes. For example, it may be constructed so as to be able to execute the special symbol variable display. Here, the special symbol variable display can be executed in the mode such as: brightness in a part or whole of the display part in the illumination means differs from that in the non-specific symbol variable display; still images, moving images, specific letters, numbers, figures, characters, which are not displayed in the non-specific symbol variable display, are displayed; variable display speed differs from that in the non-specific symbol variable display. Further, voluntary display modes may be utilized. And in a case that the specific symbol variable display is conducted, it may be constructed that the beneficial state for the player occurs with high probability in comparison with the case that the specific symbol variable display is not done. Thereby, it can be included the effect that the player's expectation increases, in excess of the previous case. Thus, such effect can contribute to increase of interest.

As for the means adopted as the third display means, it may be adopted display devices which is applicable as the first display means and the second display means, as mentioned above. It may be a case that one or plural effect display reels is/are utilized as the third display means, and both the first display means and the third means are arranged at the rear surface or side of the second display means. In this case, the symbol display area through which the player sees the display area of the third display means may be provided in the second display means. Thereby, the player can easily recognize the display contents on the display area of the third display means, thus this construction is very preferable.

Further, it may be controlled so that the images formed by superimposing the images of the second display means and the images of the third display means are seen by the player, and when such control occurs, the beneficial state occurs with higher probability than the case that such control does not occur. Thereby, it can be included the effect that the player's expectation increases, in excess of the previous case. Thus, such effect can contribute to increase of interest.

Further, any one of the first display means, the second display means and the third display means may be constructed form a movable structure with shapes such as figures, dolls, animals, insects, famous structures, fishes, vehicles. For example, the above structures may be moved with rotation, swing, reciprocal movement or vibration in cases that: the special combination is internally won, the special combination is materialized, the number of the combination which is as same as the special combination internally won but not materialized exceeds a predetermined number, the special images are displayed on the display means different from the above structures. And there may be a case that the above structure is constructed from plural members and a part of the members is/are moved. In this case, there may be a case that it can be further expected more various effects by displaying other than the image display device.

Further, the front illumination means may be arranged at the front side of the first display means and the second display means. In this case, if the inside of the game arcade is dark, the front illumination means can illuminate both the first display means and the second display means with enough light. Therefore, there may be a case that the player can clearly recognize the images displayed on the display means, thus it can be expected that the player can enjoy more various effects in the gaming machine.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

What is claimed is:

1. A gaming machine comprising:

a game result display device for displaying a game result; and a beneficial state generating device for generating a beneficial state for a player when a specific game result is displayed on the game result display device;

wherein the game result display device includes a first display device and a second display device arranged at a more front side than a display area of the first display device when seen from a front side of the gaming machine; and wherein the second display device defines a liguid crystal display area having an effect display area and a plurality of symbol display areas, the plurality of symbol display areas being provided to selectively display the game result, the second display device operative to display a specific image simultaneously on at least partially the effect display area and on at least partially one of the plurality of symbol display areas such that the liquid crystal display area prevents a user from seeing the game result in the plurality of symbol display areas or on at least partially the effect display area but not on any of the plurality of symbol display areas such that the liquid crystal display area permits the user to see the game result on the plurality of symbol display areas along with at least a portion of the specific image displayed only on the effect display area.

2. The gaming machine according to claim 1, wherein the specific image is displayed based on information concerning with a game.

3. The gaming machine according to claim 2, further comprising:

an internal winning combination determination device for determining an internal winning combination based on an output from a game start instruction device for starting the game; and a game result display control device for conducting display control of the game result display device based on a determined result by the internal winning combination determination device;

wherein the specific image is displayed based on information concerning with the internal winning combination included in the information concerning with the game.

4. The gaming machine according to claim 3, wherein a probability with which the specific image is displayed in a case that the internal winning combination determination device determines a specific winning combinations as the internal winning combination, is set higher, comparing with a probability with which the specific image is displayed in a case that the internal winning combination determination device determines a winning combination other than the specific winning combination as the internal winning combination.

5. The gaming machine according to claim 2, wherein the specific image is displayed based on that a winning combination, which is materialized, included in the information concerning with the game, is the specific winning combination.

6. The gaming machine according to claim 1, further comprising:

another display device other than the first display device and the second display device;

wherein the second display device and the another display device display images which have relevance with each other.

7. A gaming machine comprising:

a game result display device for displaying a game result, the game result display device including a first display device and a second display device with symbol display areas through which the first display device is seen and recognized, the second display device being arranged in front of a display area of the first display device when seen from a front side of the gaming machine;

an internal winning combination determination device for determining at least one of a first internal winning combination and a second internal winning combination based on an output from a game start instruction device for starting the game;

a game result display control device for conducting display control of the game result display device based on a determined result by the internal winning combination determination device; and a beneficial state generating device for generating a beneficial state for a player when a specific game result is displayed on the game result display device;

wherein the first internal winning combination corresponds to a first specific winning combination relating to a first specific image displayed on the second display device, wherein the second internal winning symbol combination corresponds to a second specific winning combination relating to a second specific image displayed on the second display device, wherein the second specific winning combination is more beneficial for the player than the first specific winning combination and the second specific image is set larger than the first specific image, wherein the game result display control device controls the second display device so as to display the first specific image over a substantially whole display area of the second display device when the internal winning combination determination device determines the first specific winning combination as the first internal winning combination, and wherein the game result display control device controls the second display device so as to display the second specific image over the substantially whole display area of the second display device when the internal winning combination determination device determines the second specific winning combination as the second internal winning combination.

8. The gaming machine according to claim 7, wherein a probability with which the second specific image is displayed in a case that the internal winning combination determination device determines the second specific winning combination as the second internal winning combination, is set higher, comparing with a probability with which the first specific image is displayed in a case that the internal winning combination determination device determines the first winning combination other than the second specific winning combination as the first internal winning combination.

9. The gaming machine according to claim 7, further comprising:

a third display device other than the first display device and the second display device;

wherein the second display device and the third display device display one of the first specific image and the second specific image so that the one specific image constructs one continuous image over the second display device and the third display device.

* * * * *